(12) United States Patent
Cheng

(10) Patent No.: US 10,466,466 B2
(45) Date of Patent: Nov. 5, 2019

(54) IMAGING ADAPTER FOR MICROSCOPE AND PORTABLE ELECRONIC DEVICE

(71) Applicant: Du Cheng, New York, NY (US)

(72) Inventor: Du Cheng, New York, NY (US)

( * ) Notice: Subject to any disclaimer, the term of this patent is extended or adjusted under 35 U.S.C. 154(b) by 497 days.

(21) Appl. No.: 15/169,078

(22) Filed: May 31, 2016

(65) Prior Publication Data
US 2017/0336619 A1 Nov. 23, 2017

Related U.S. Application Data

(63) Continuation-in-part of application No. 29/554,506, filed on Feb. 11, 2016, now abandoned.

(51) Int. Cl.
| | |
|---|---|
| G02B 21/26 | (2006.01) |
| G02B 21/36 | (2006.01) |
| G02B 25/00 | (2006.01) |
| G02B 7/02 | (2006.01) |
| H04N 5/225 | (2006.01) |
| H04N 7/14 | (2006.01) |
| G06F 3/14 | (2006.01) |
| G02B 21/00 | (2006.01) |
| H04N 5/232 | (2006.01) |

(52) U.S. Cl.
CPC ............ *G02B 21/368* (2013.01); *G02B 7/02* (2013.01); *G02B 7/021* (2013.01); *G02B 21/0008* (2013.01); *G02B 21/362* (2013.01); *G02B 25/001* (2013.01); *G06F 3/1454* (2013.01); *H04N 5/2252* (2013.01); *H04N 5/2254* (2013.01); *H04N 5/2257* (2013.01); *H04N 7/142* (2013.01); *H04N 7/147* (2013.01); *G02B 25/005* (2013.01); *G02B 25/008* (2013.01); *H04N 5/23293* (2013.01)

(58) Field of Classification Search
CPC ...... G02B 21/00–368; G02B 23/00–26; G02B 25/00–04; H04M 1/027–0272; G03B 17/56–568; A61B 5/6898
See application file for complete search history.

(56) References Cited

U.S. PATENT DOCUMENTS

| | | | | |
|---|---|---|---|---|
| 4,307,940 A | * | 12/1981 | Hagedorn-Olsen .... | G03B 27/32 355/55 |
| 2009/0093274 A1 | * | 4/2009 | Yamamoto ......... | G02B 13/0015 455/566 |
| 2012/0320340 A1 | * | 12/2012 | Coleman, III ........... | A61B 3/14 351/208 |
| 2013/0016963 A1 | * | 1/2013 | Miller ................... | G02B 21/362 396/428 |
| 2014/0051923 A1 | * | 2/2014 | Mirza ................ | A61B 1/00126 600/103 |

(Continued)

*Primary Examiner* — William R Alexander
*Assistant Examiner* — Jeffrey E Madonna
(74) *Attorney, Agent, or Firm* — Zachary R. Christiansen

(57) ABSTRACT

In general this device allows one to rapidly configure a mobile phone for use with a microscope. When using the device a person can take images or videos and rapidly share them, or have another user videoconference in and see the images in real time. Further, it saves both money and time when using a microscope in a laboratory (or other) setting. This device can also be used without microscope for a macro lens with illumination and light differential for purposes such as jewelry or medical examination.

3 Claims, 30 Drawing Sheets

(56) References Cited

U.S. PATENT DOCUMENTS

| | | | | |
|---|---|---|---|---|
| 2014/0362283 | A1* | 12/2014 | Coppage | G03B 17/561 348/373 |
| 2015/0103317 | A1* | 4/2015 | Goldfain | A61B 3/156 351/207 |
| 2015/0331226 | A1* | 11/2015 | Eski | G01J 3/0291 359/381 |
| 2016/0113489 | A1* | 4/2016 | Myung | A61B 3/117 351/206 |

\* cited by examiner

IMAGING ADAPTER FOR MICROSCOPE AND PORTABLE ELECRONIC DEVICE

CROSS REFERENCE TO RELATED APPLICATIONS

Not applicable.

REFERENCE TO COVERNMENT FUNDING SOURCES

Not applicable.

REFERENCE TO SEQUENCE LISTING

Not applicable.

BACKGROUND

Fields of the Invention

The disclosure as detailed herein is in the technical field of lab equipment. More specifically, the present disclosure relates to the technical field of microscopes. Even more specifically, the present disclosure relates to the technical field of lens adapters.

Description of Related Art

It is thought that this invention may improve the well being of multiple types of people who need magnification and/or use microscopes regularly. These include but are not limited to: researchers, jewelers, entomologists, ophthalmologists, clinicians, technicians, and artists.

For example, it is well known that research labs have microscopes that allow one to document and research the minute characteristics of scientific phenomena. However, cameras are expensive and as such, typically not every microscope in a research lab has a camera attached to it. Further, even in research labs with camera equipped microscopes, there are numerous drawbacks to proprietary imaging systems. Imaging systems often take long time to turn on, need special software and researcher training. Additionally, these software packages often do have a steep learning curve to understanding the imaging features in new software. Further, they may not have slow motion or other extra features (sharing) extant on mobile phone software.

The US patent publication Ser. No. 14/019,858 (herein termed the "'858' publication") discloses a means for attaching a smart phone to a microscope. However, the '858' publication does not disclose an attachment on the interior of the surface of the microscope. Nor does the '858' disclose a rotatable latch that allows one to stabilize the viewing. Further, the '858' fails to disclose a lens set that adapts to particular dimensions of the microscope it is attached to. The U.S. patent publication 20130100271 (herein termed the "'271' publication") discloses a universal adapter system having a video camera mount and a digital camera mount for attaching a video camera and a digital camera to a single port. However, the '271' publication does not disclose an adapter specifically configured for both microscope and smartphone type, nor does it disclose a rotatable latch that allows one to stabilize the viewing.

GENERAL SUMMARY OF THE INVENTION

In general this device allows one to rapidly configure a mobile phone for use with a microscope. When using the device a person can take images or video and rapidly share them, or have another user videoconference in and see the images in real time. Further, it saves both money and time when using a microscope in a laboratory (or other) setting.

In some embodiments, the instant invention enhances the speed of research in a laboratory by decreasing the learning curve associated with taking microscope images.

In some embodiments, the instant invention enhances the speed of research in a laboratory by decreasing the start up time for microscopy.

In some embodiments, the instant invention enhances the speed of research in a laboratory by minimizing the starting requirements such as decreasing the need for alignment and focus.

In some embodiments, the instant invention allows jewelers to more easily examine gemstones.

In some embodiments, the instant invention allows one to easily share or communicate microscopic images via the internet.

In some embodiments, the instant invention allows one to easily share or communicate microscopic images via a real time video conference on a mobile device.

In some embodiments, the instant invention allows one to easily share or communicate microscopic images via a real time display to one or more 3rd party monitors.

In some embodiments, the instant invention allows one to easily share or communicate microscopic images for practicing medicine.

In some embodiments, the instant invention allows one to have an adapter that fits in the eyepiece tube of an existing microscope In some embodiments, the instant invention allows one to have a means to safely house a lens set and establish the correct focal distances for capturing images for a mobile phone.

In some embodiments, the instant invention allows one to have a means to examine features of microscopic phenomena without a microscope, such as for skin pathology or examining insects in a classroom.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person of ordinary skill in the relevant art will recognize that other configurations and arrangements can be used without departing from the spirit and scope of the invention. It will be apparent to a person of ordinary skill in the relevant art that this invention can also be employed in a variety of other systems and applications.

Figure 1:
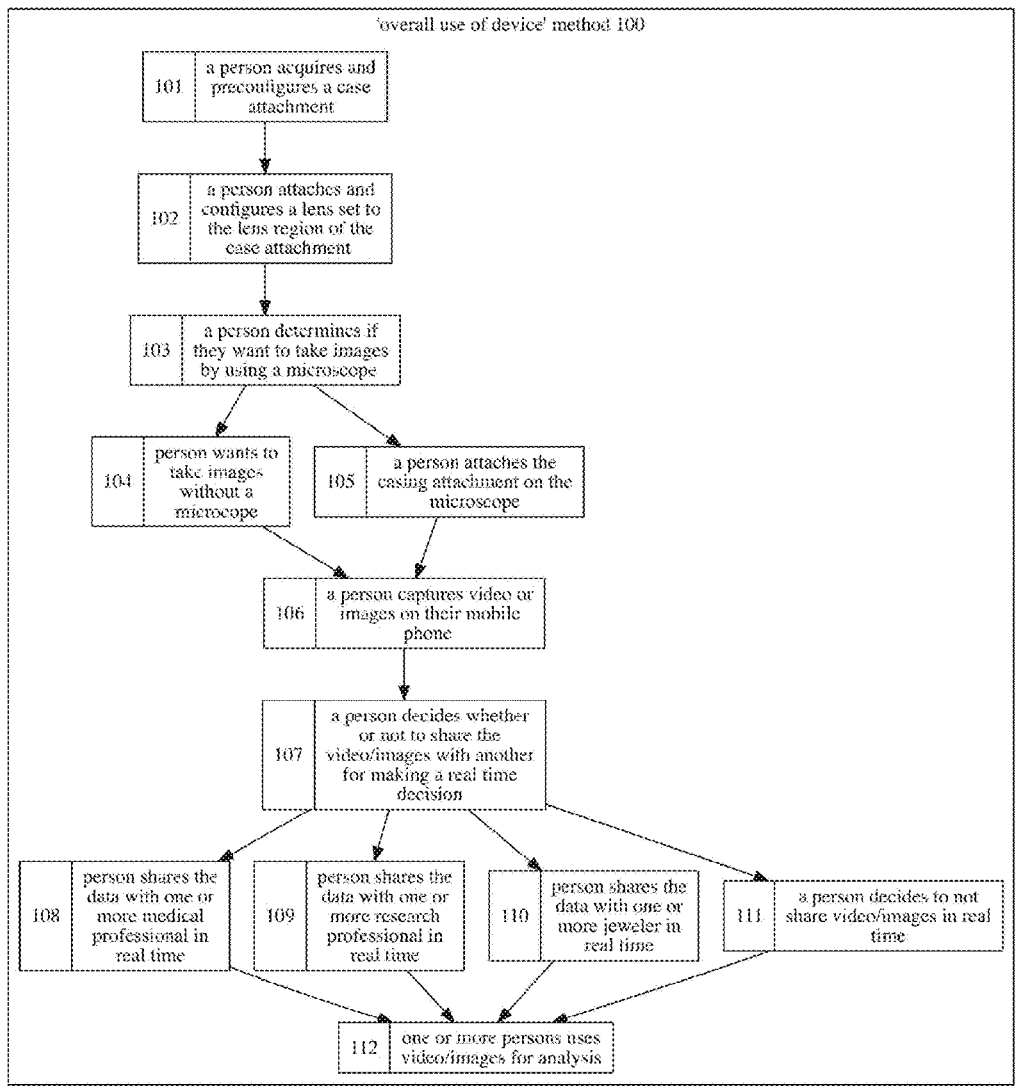
FIG. 1 is a diagram view which shows overall use of device.

A general method 'overall use of device' FIG. 1 for using the instant invention preferably involves several steps comprising:
1. a person acquires and pre-configures a case attachment. 101
2. a person attaches and configures a lens set to the lens region 8 of the case attachment 6. 102
3. a person determines if they want to take images by using a microscope. 103
4. a person attaches the case attachment 6 on the microscope. 104
5. a person captures video or images on their mobile phone. 106
6. a person decides whether or not to share the video/images with another for making a real time decision. 107
12. one or more persons uses video/images for analysis. 112

The above method is herein identified as method 100, and while these steps are depicted in an order, it is thought that these steps may be performed in one or more alternative orders and still reflect the novelty of the invention.

When a person acquires and pre-configures a case attachment. First a person must acquire the case attachment 6. Spatially, the case attachment is preferably positioned behind the microscope and surrounding the mobile phone. In some embodiments, the person may decide to use the case attachment and lens not with a microscope or adapter. The case attachment is attached to the mobile phone. The case attachment preferably comprises a lens holder 7, a horizontal latch 50, and finally an inside region 51.

Next a person would acquire a microscope and determines the diameter of the eyepiece tube. The microscope comprises an optical instrument containing one or more lenses producing an enlarged image of a sample placed in the focal plane. In some embodiments, it is thought that an example of a microscope could be a stereo-microscope, a compound microscope or perhaps a fluorescent microscope and the like. The microscope preferably comprises one or more eyepiece 4 and one or more eyepiece tube. The eyepiece 4 comprises a cylinder containing two or more lenses; its function is to bring the image into focus for the eye. In some embodiments, it is thought that examples of an eyepiece 4 may include a 20× ocular, a 5× ocular, or a 10× ocular. The eyepiece tube comprises a structure that connects the eyepiece to the objective lenses.

Next a person would acquire a mobile phone equipped with a digital camera 2. A mobile phone comprises a mobile phone with an advanced mobile operating system which combines features of a personal computer operating system with other features useful for mobile or handheld use. In some embodiments, it is thought that examples of an mobile phone may include a camera phone, a smart phone, a videophone, or a tablet. The mobile phone preferably comprises a digital camera 2. A digital camera 2 comprises a camera on a mobile phone which is able to capture photographs or video. In some embodiments, it is thought that an example of an digital camera 2 could CMOS type camera or perhaps a CCD camera and the like. Next, a person configures the case attachment to be operable with a mobile phone.

Figure 2:
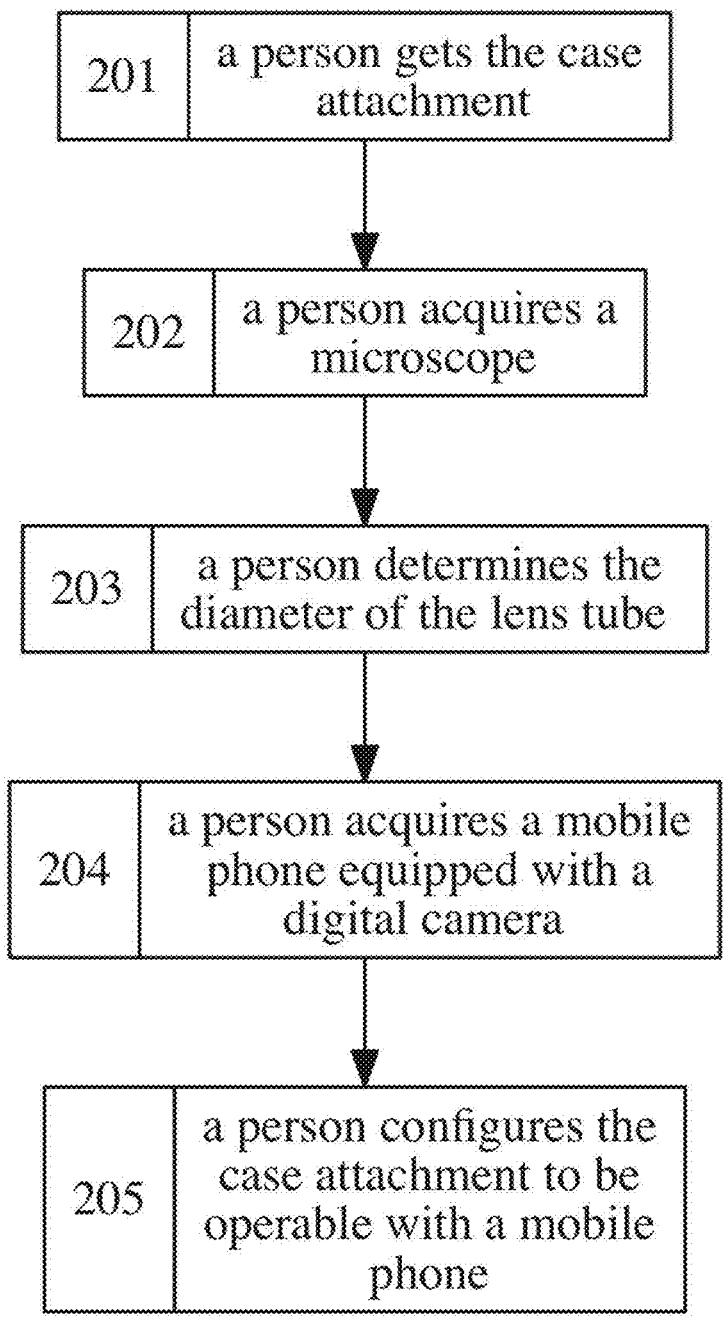
FIG. 2 is a diagram view which shows steps of a person determining the right components for their use.

In summary: A sub-method 'configures a case attachment' FIG. 2 of step 101 has a multiple sub steps as follows:
1. a person gets the case attachment 6. 201
2. a person acquires a microscope. 202
3. a person determines the diameter of the eyepiece tube. 203

4. a person acquires a mobile phone equipped with a digital camera 2. 204
5. a person configures the case attachment to be operable with a mobile phone. 205

The above method is herein identified as method 200, and while these steps are depicted in an order, it is thought that these steps may be performed in one or more alternative orders and still reflect the novelty of the invention.

Figure 3:
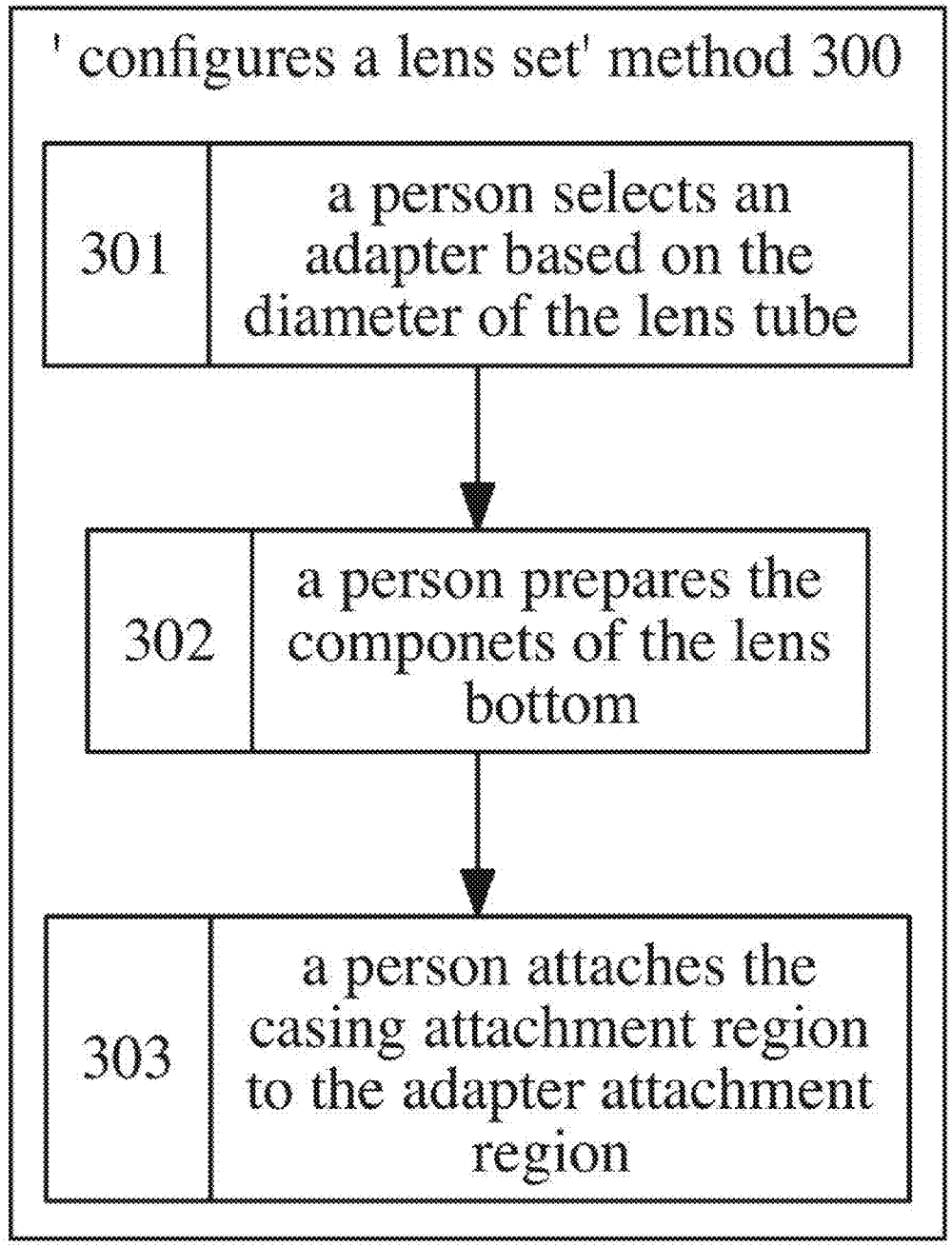
FIG. 3 is a diagram view which shows steps of a person assembling a lens set and attaching it to the case.
Figure 4:
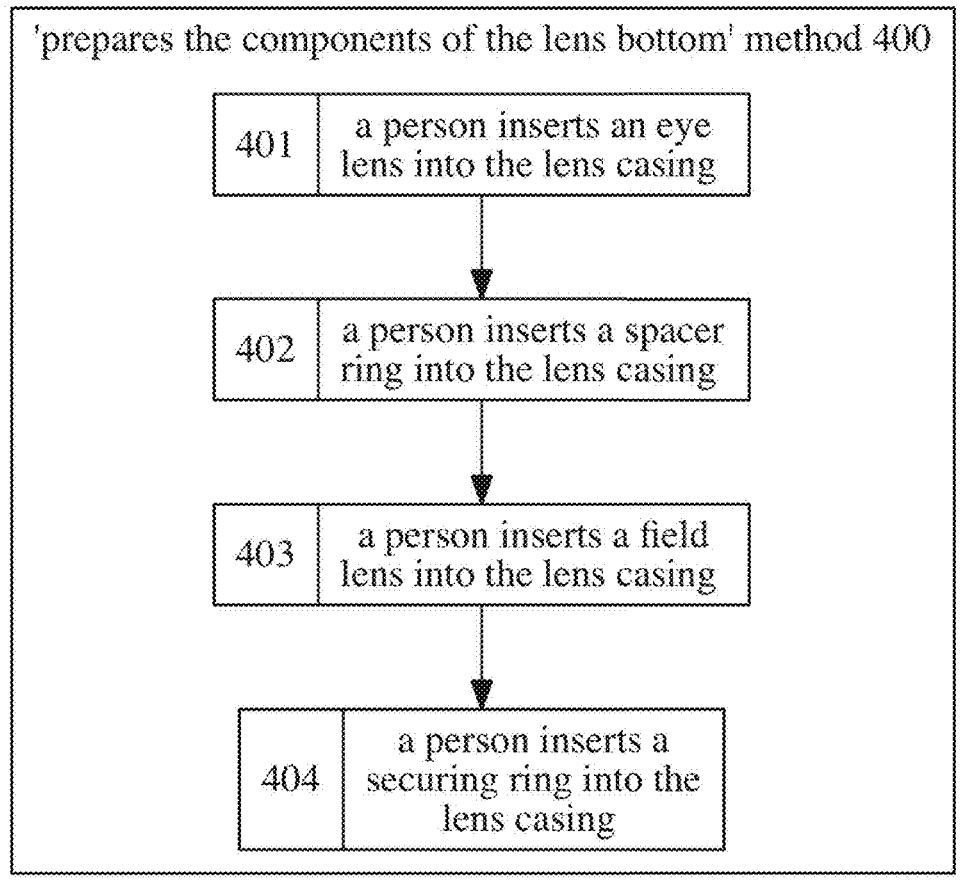
FIG. 4 is a diagram view which shows steps of a person preparing the components of the lens casing bottom region.
Figure 5:
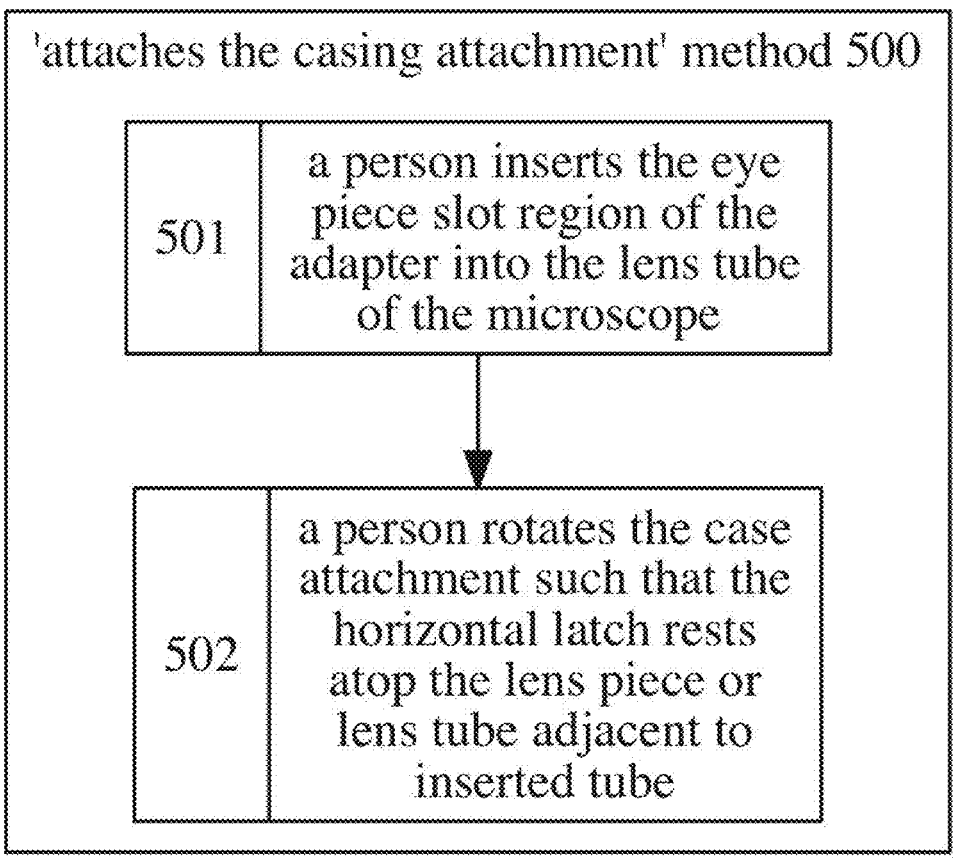
FIG. 5 is a diagram view which shows steps of a person attaching a case to a microscope.
Figure 6:
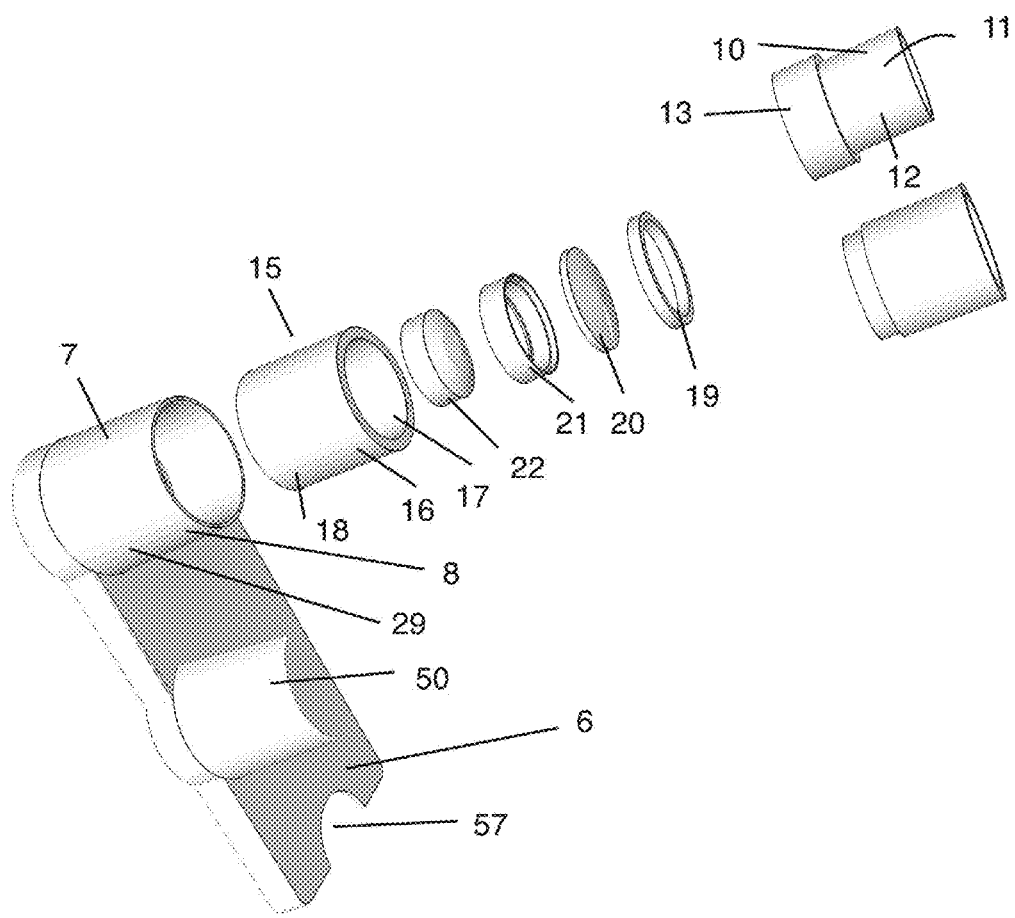
FIG. 6 is a exploded view which shows the components of the device.
Figure 7:
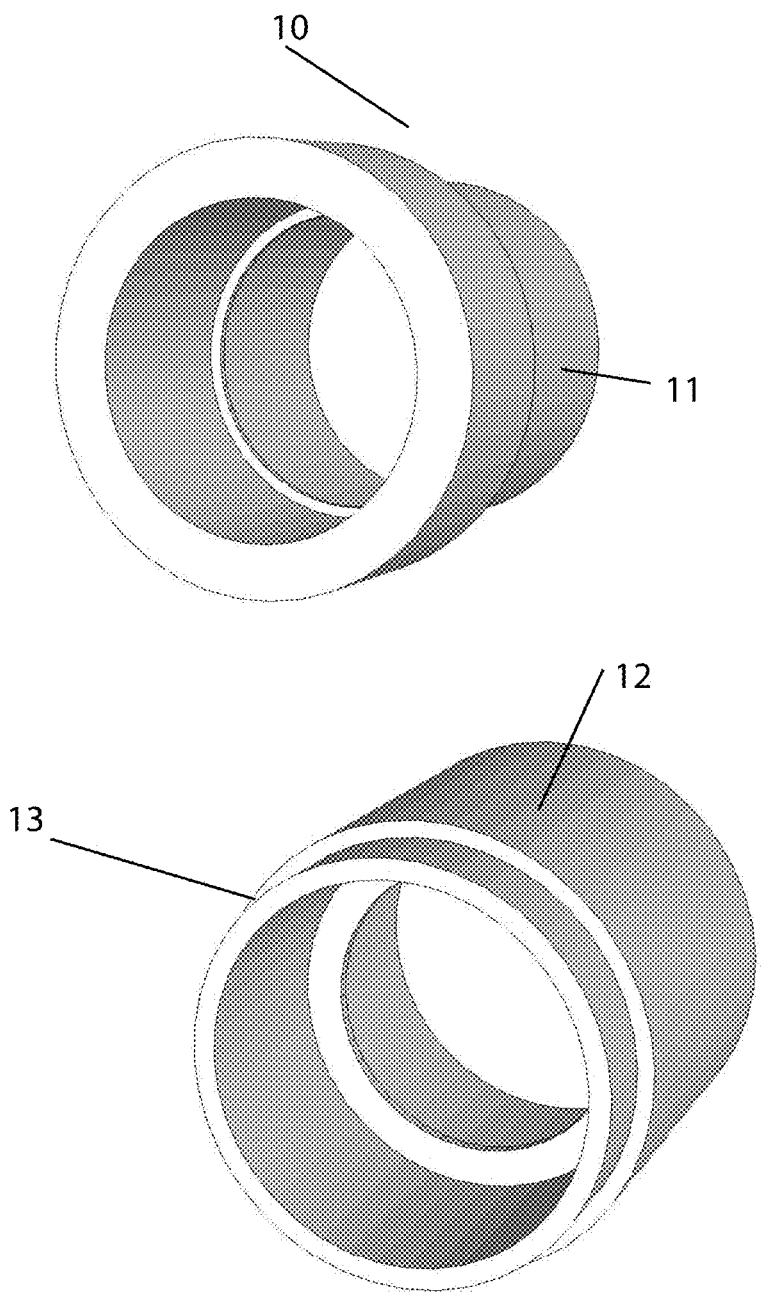
FIG. 7 is a perspective view which shows bottom of two separate adapters that would be used individually.
Figure 8:
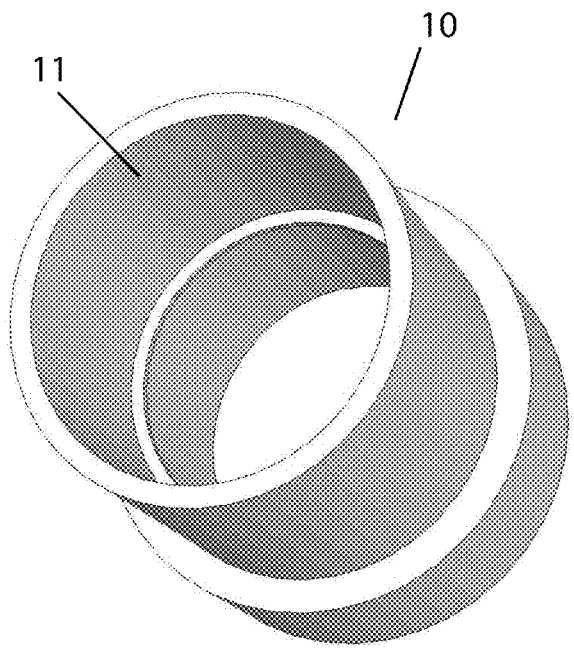
FIG. 8 is a perspective view which shows the top of two separate adapters that would be used individually.
Figure 8:
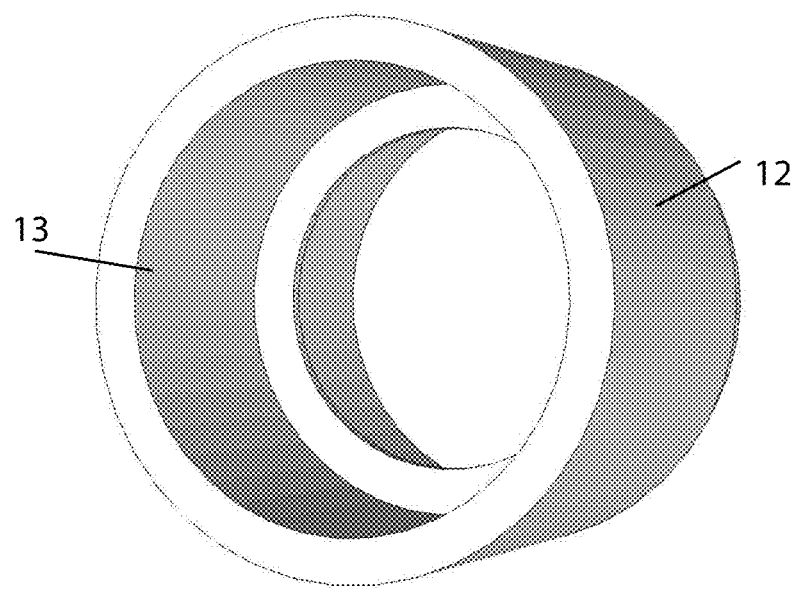
Figure 9:
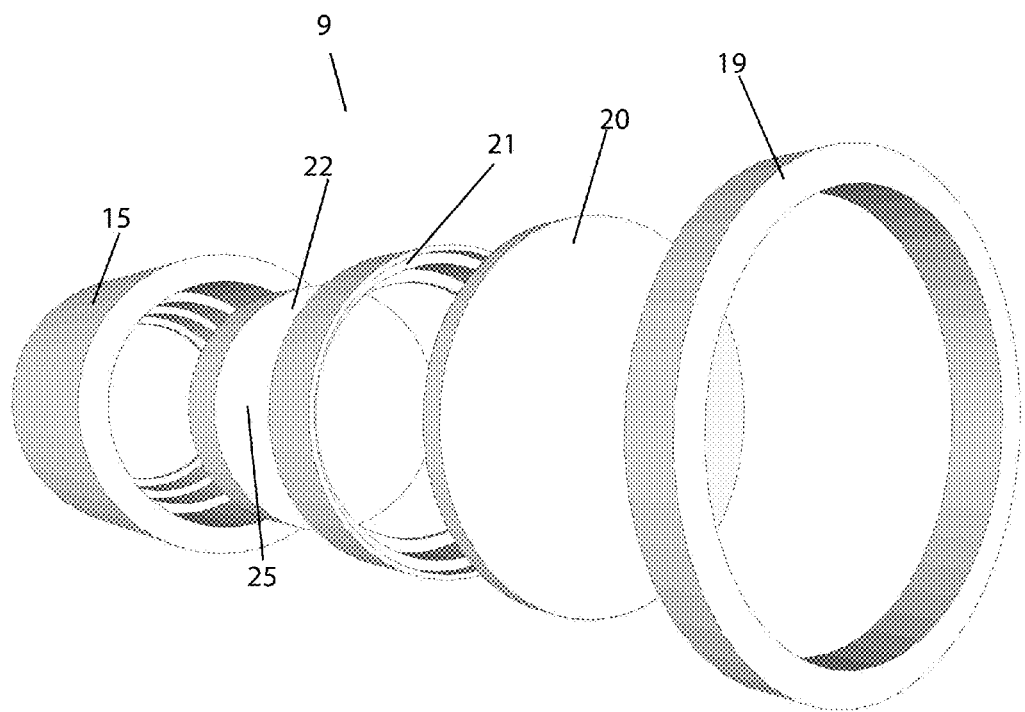
FIG. 9 is an exploded view which shows the pieces that comprise the lens assembly.
Figure 10:
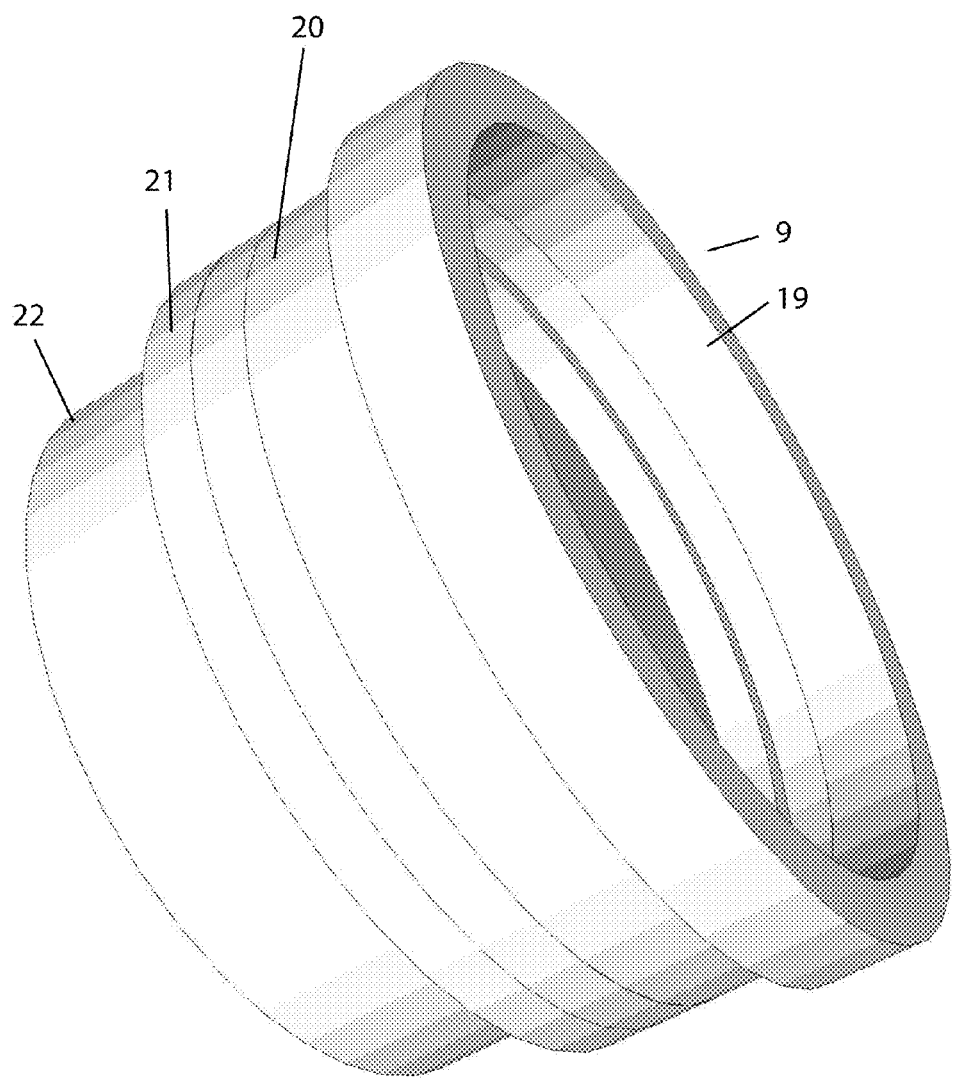
FIG. 10 is a perspective view which shows pieces of the lens assembly orientation, without the casing visible.
Figure 11:
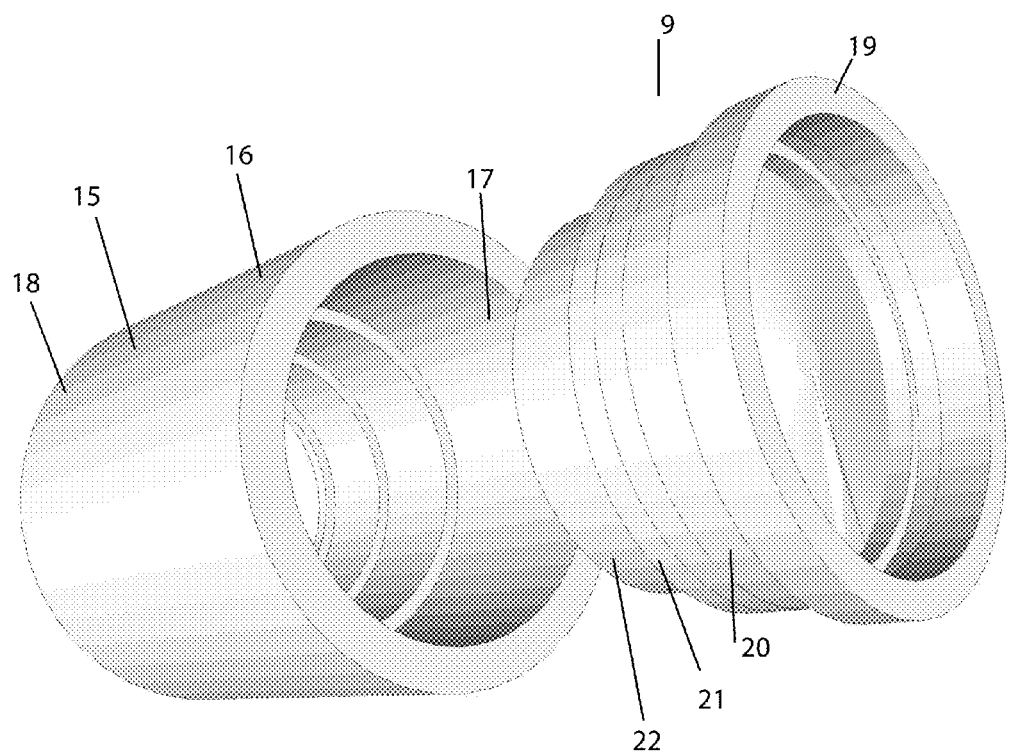
FIG. 11 is a exploded view which shows pieces of the lens assembly inserting on the lens casing.
Figure 12:
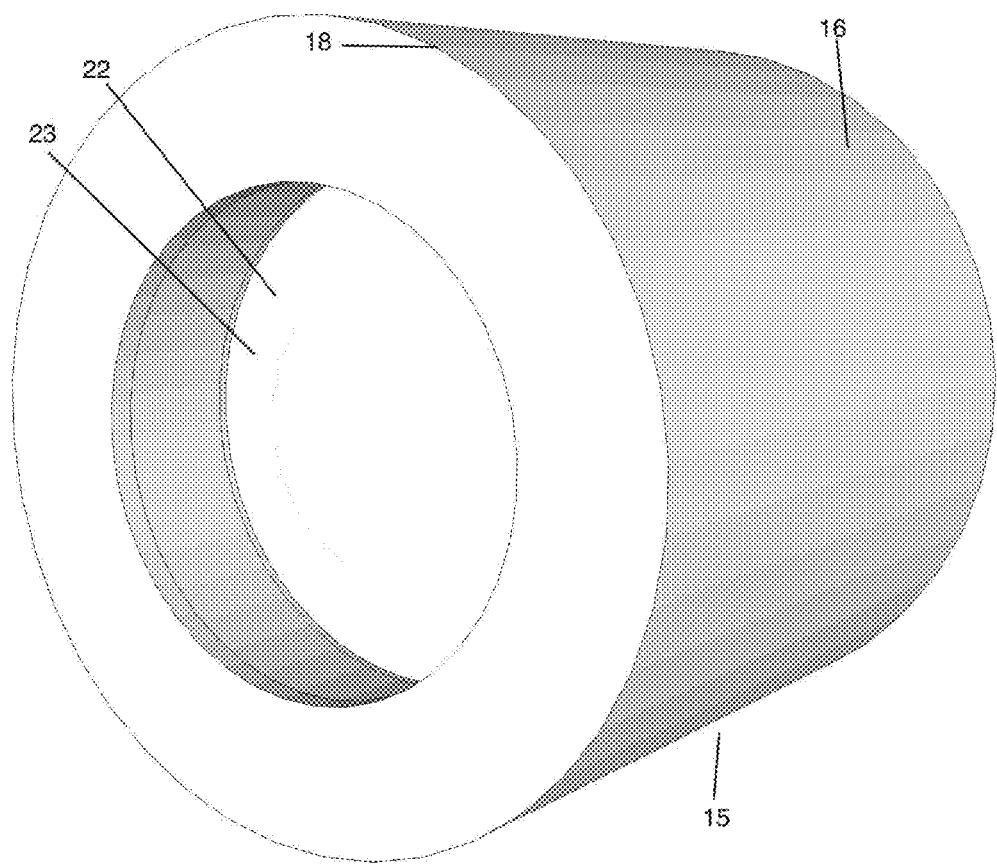
FIG. 12 is a top perspective view which shows combined lens assembly and casing.
Figure 13:
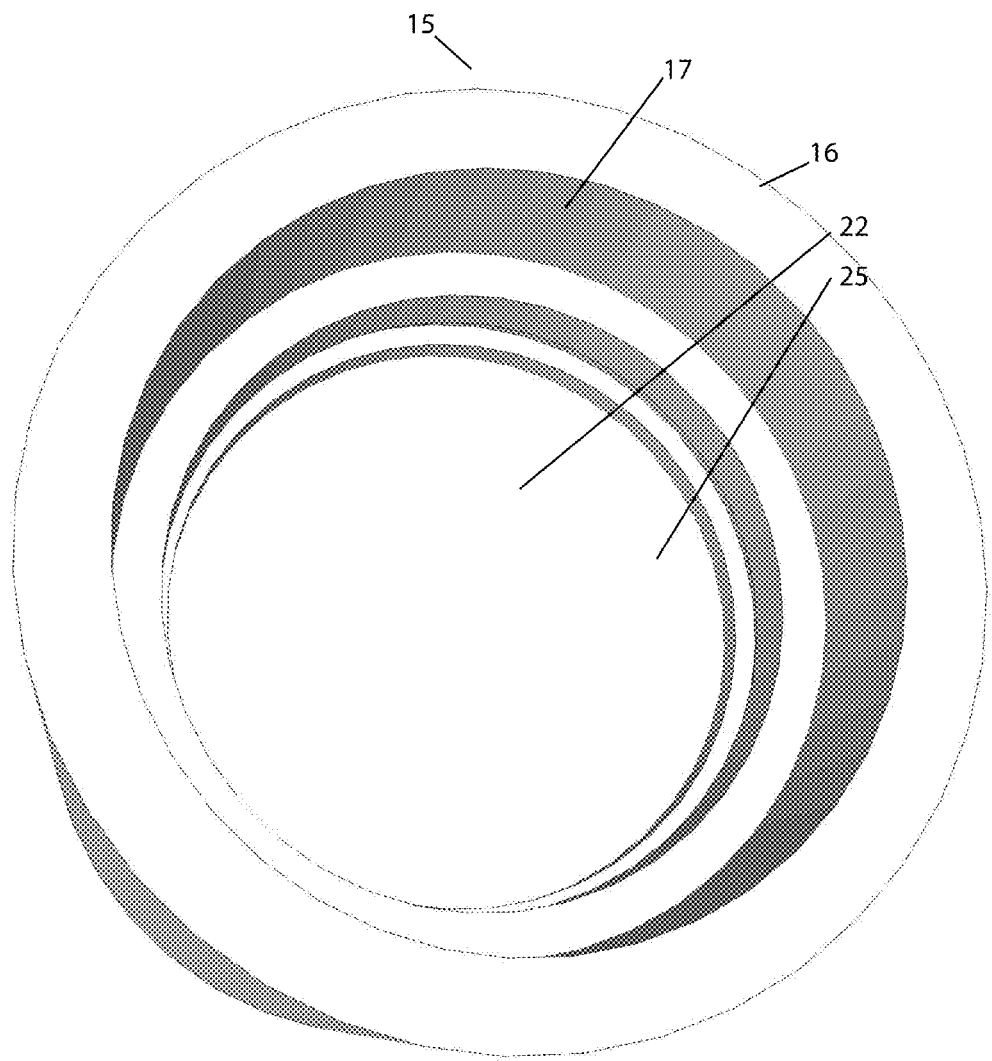
FIG. 13 is a bottom perspective view which shows combined lens assembly and casing.
Figure 14:
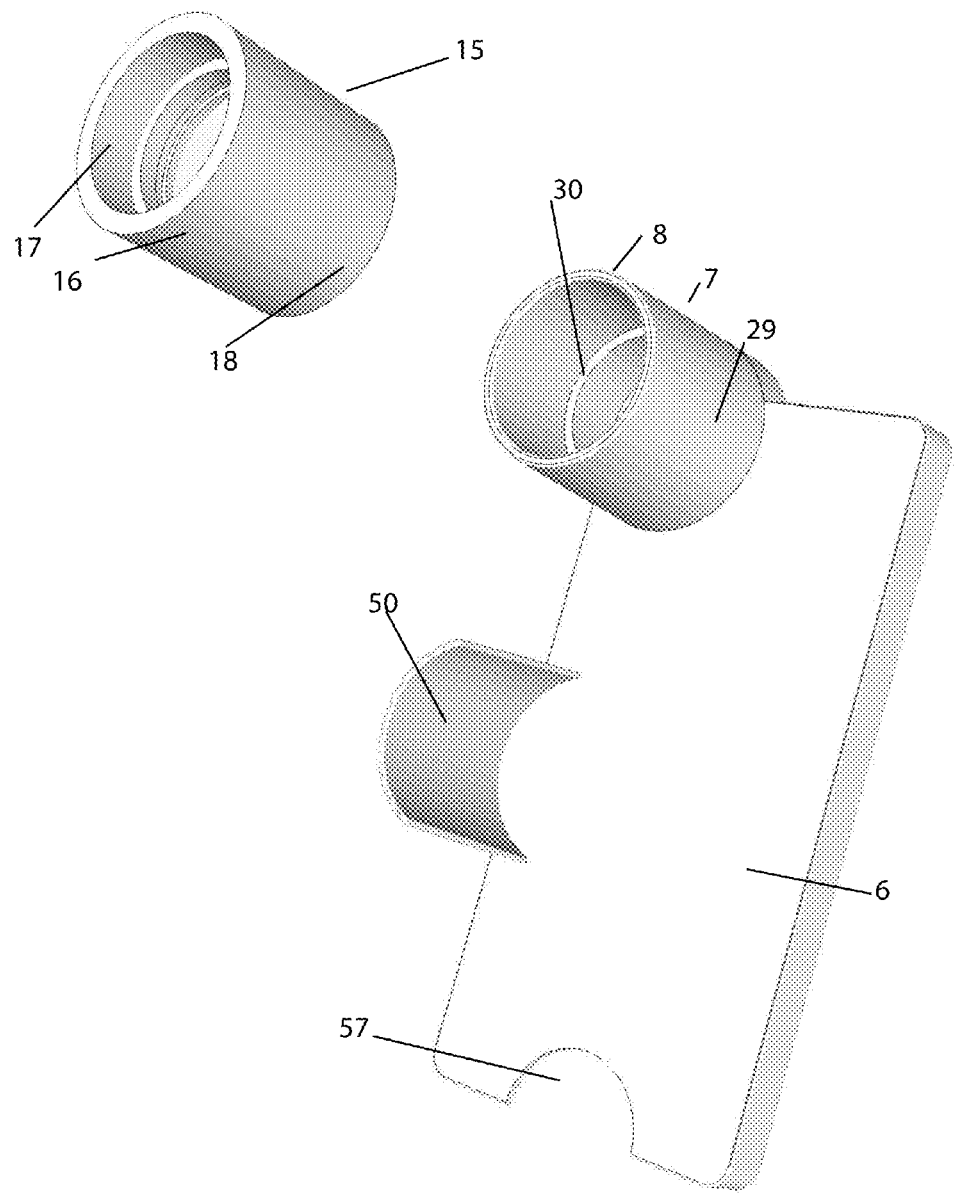
FIG. 14 is a exploded view which shows lens casing and its components relative to the casing attachment.
Figure 15:
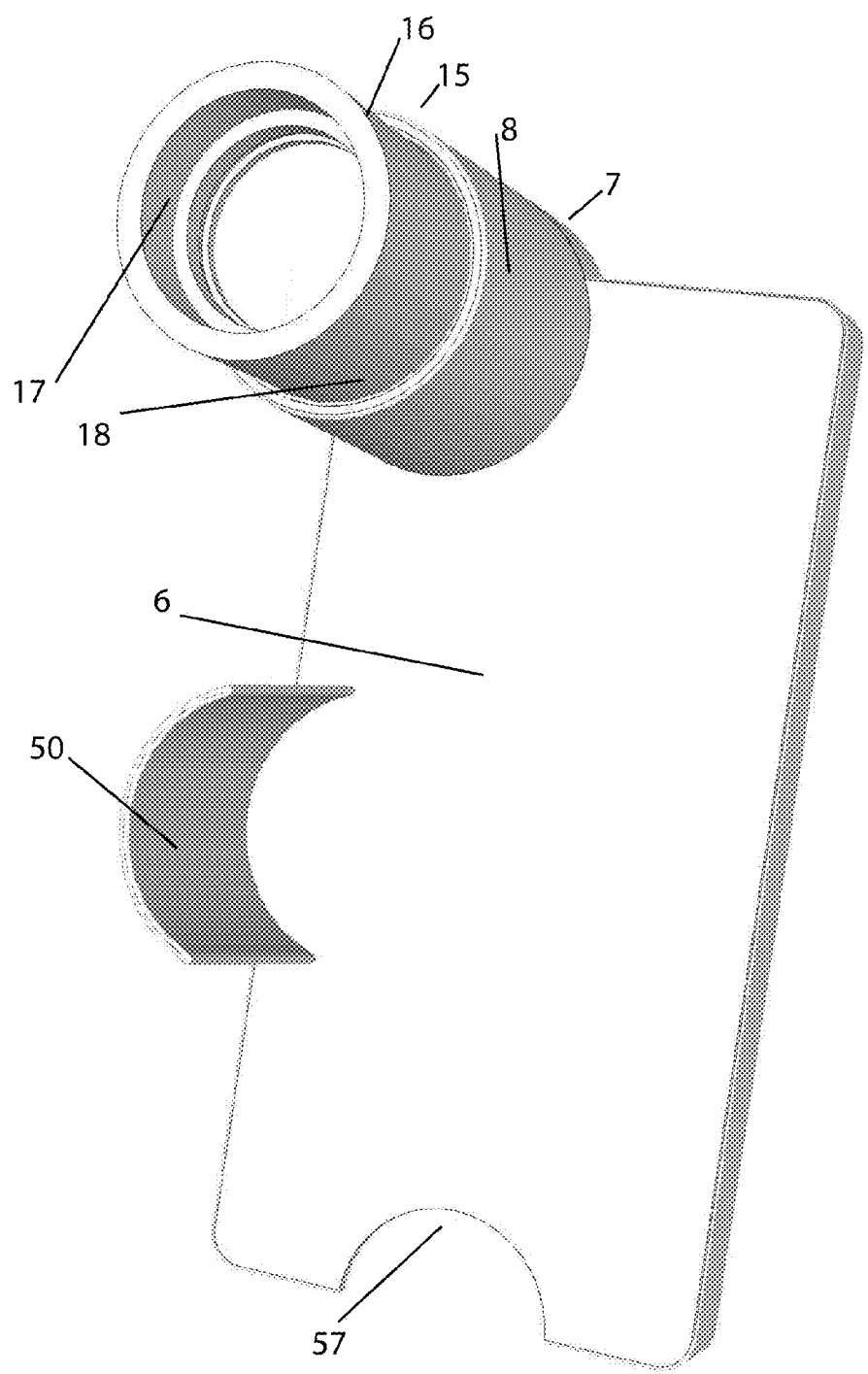
FIG. 15 is a perspective view which shows lens casing and its components inserted into the casing attachment.
Figure 16:
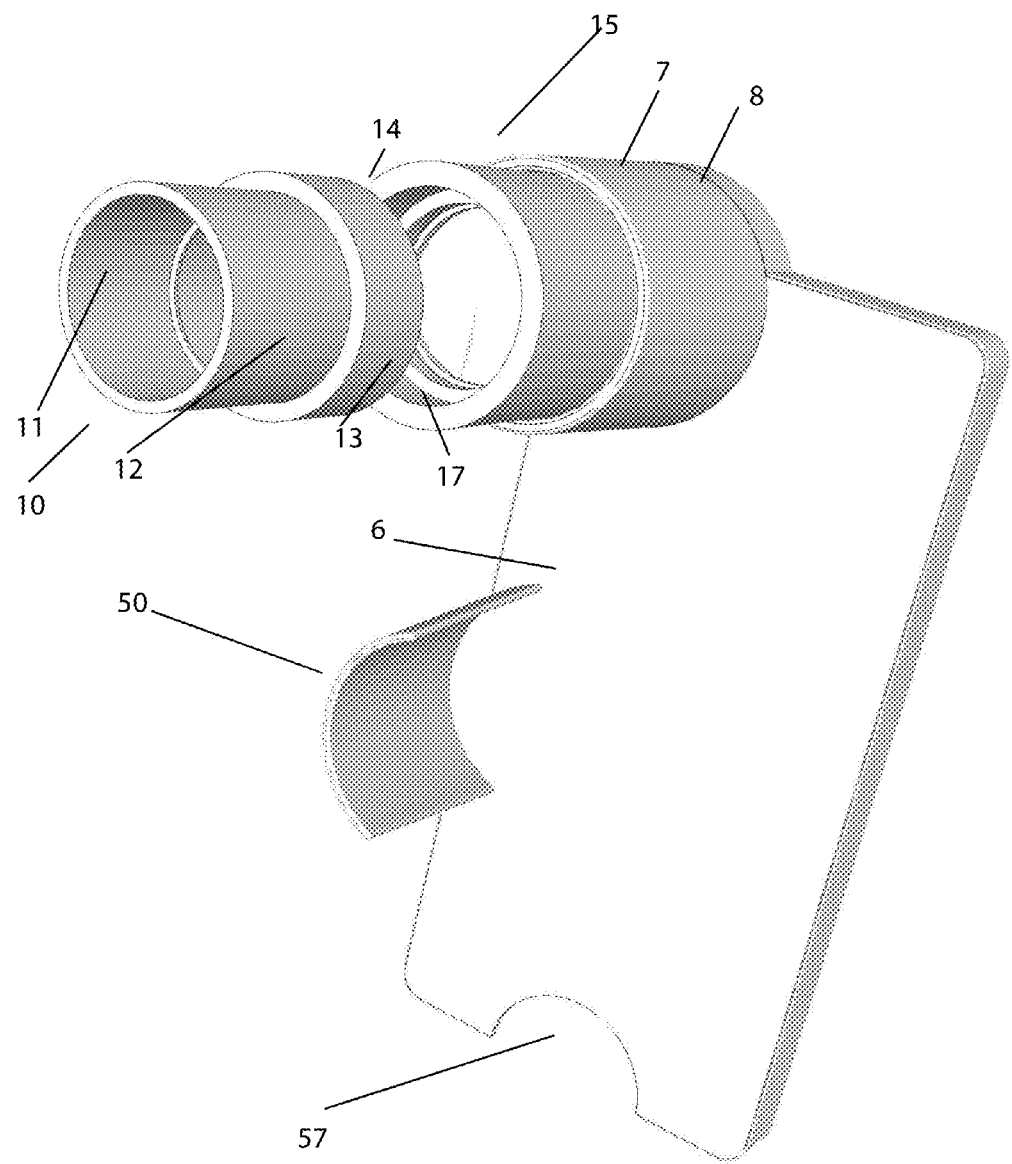
FIG. 16 is a exploded view which shows adapter configured to attach on the lens casing.
Figure 17:
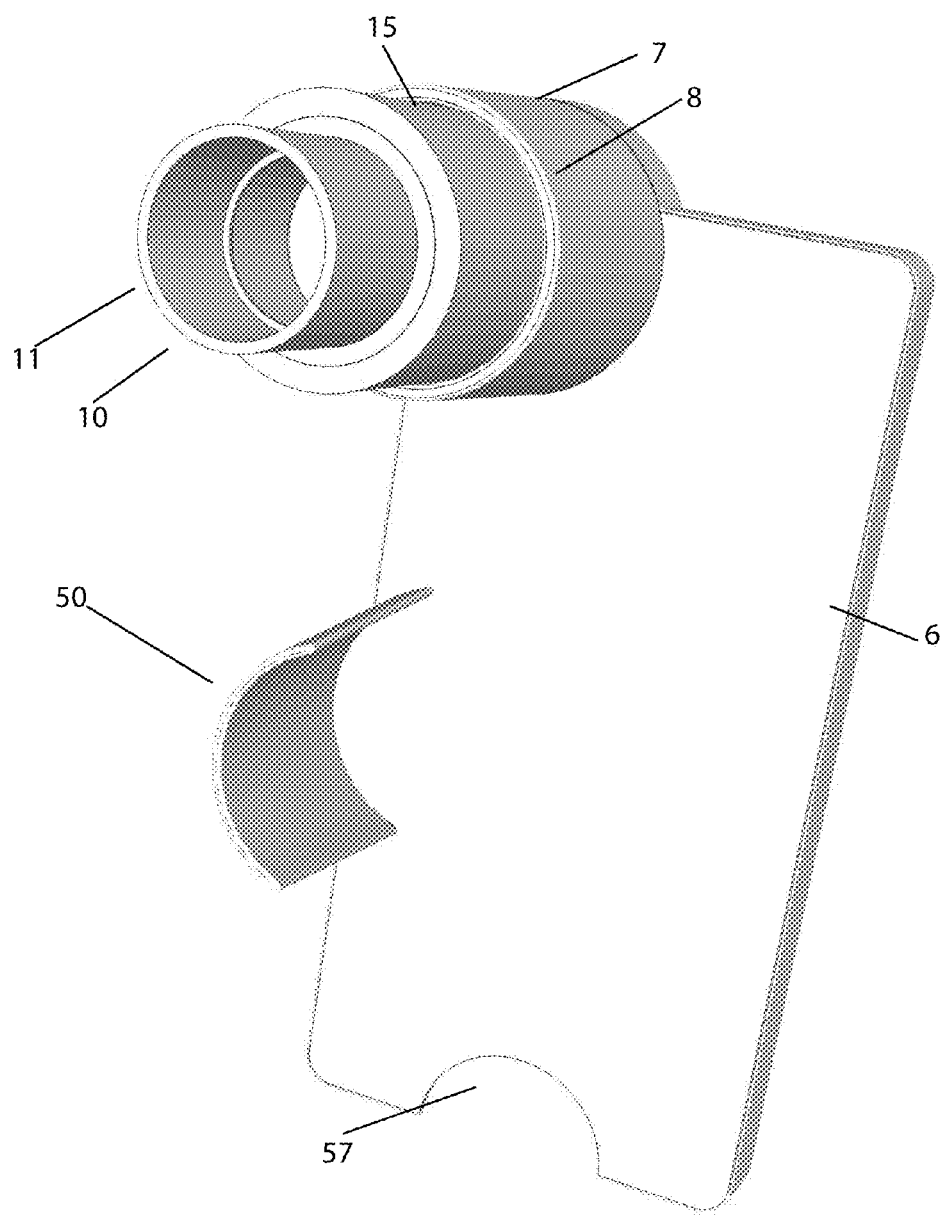
FIG. 17 is a perspective view which shows alternate adapter configured to attach on the lens casing.
Figure 18:
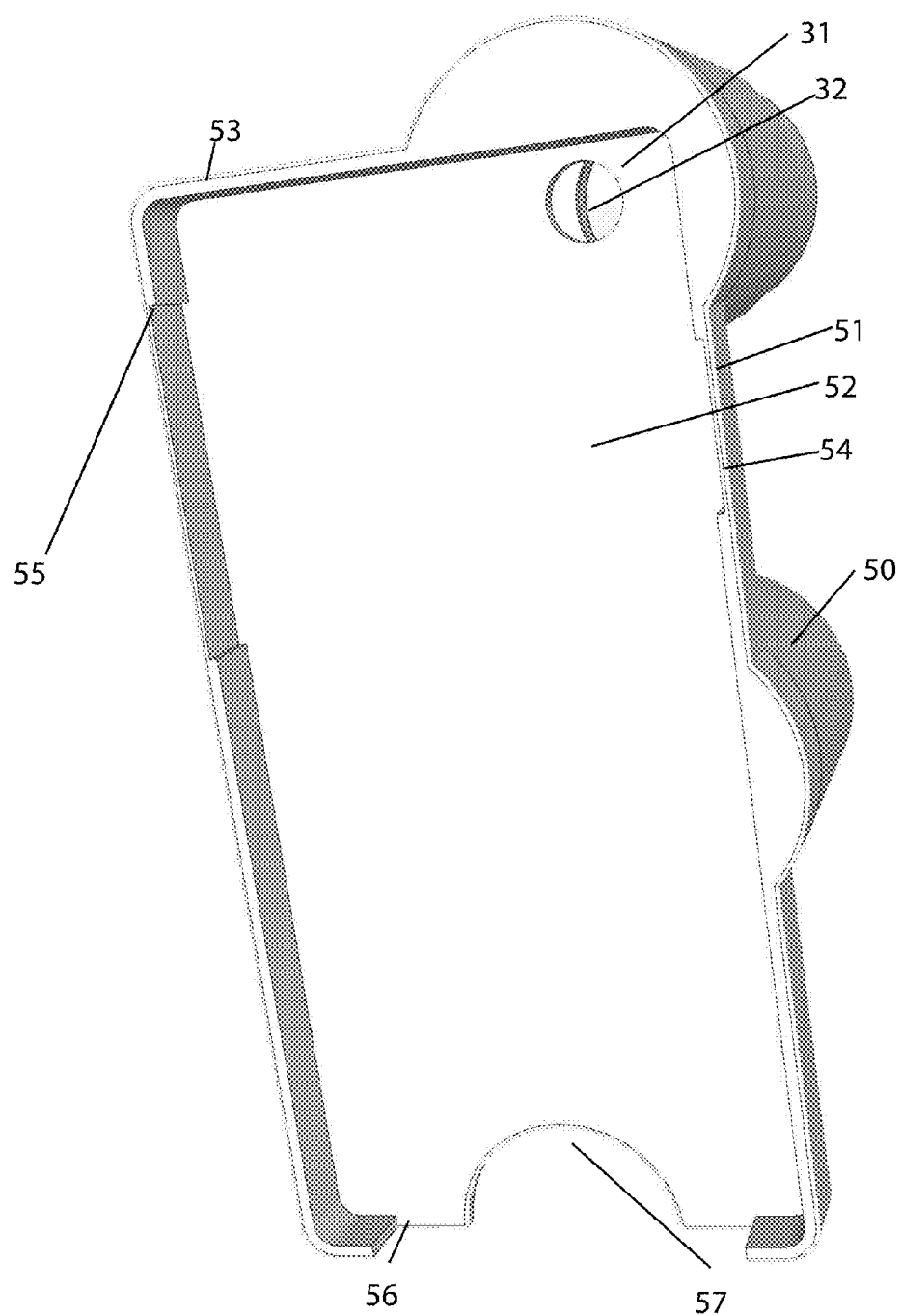
FIG. 18 is a bottom perspective view which shows case attachment.
Figure 19:
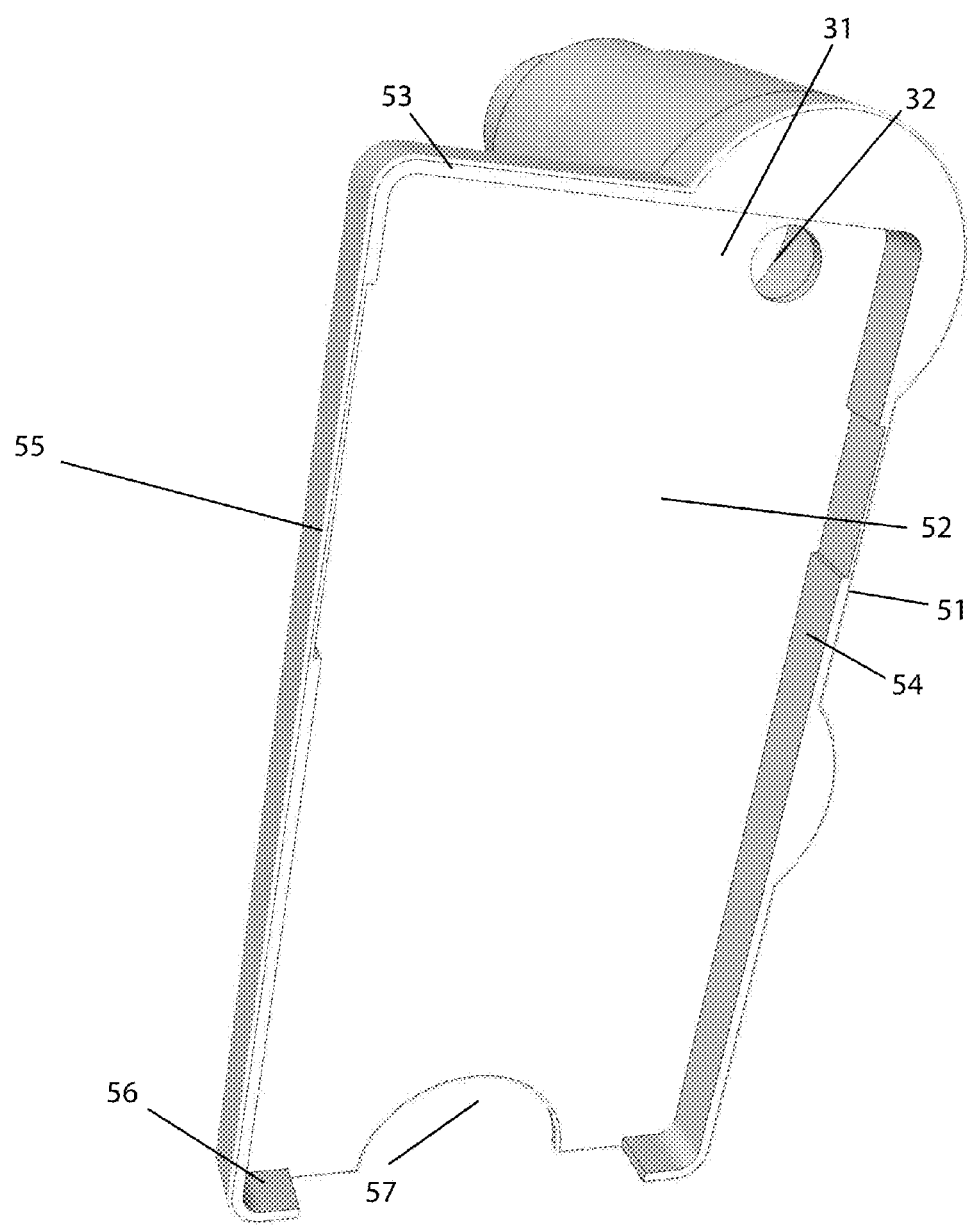
FIG. 19 is a bottom perspective view which shows alternate adapter configured to attach on the lens case attachment.
Figure 20:
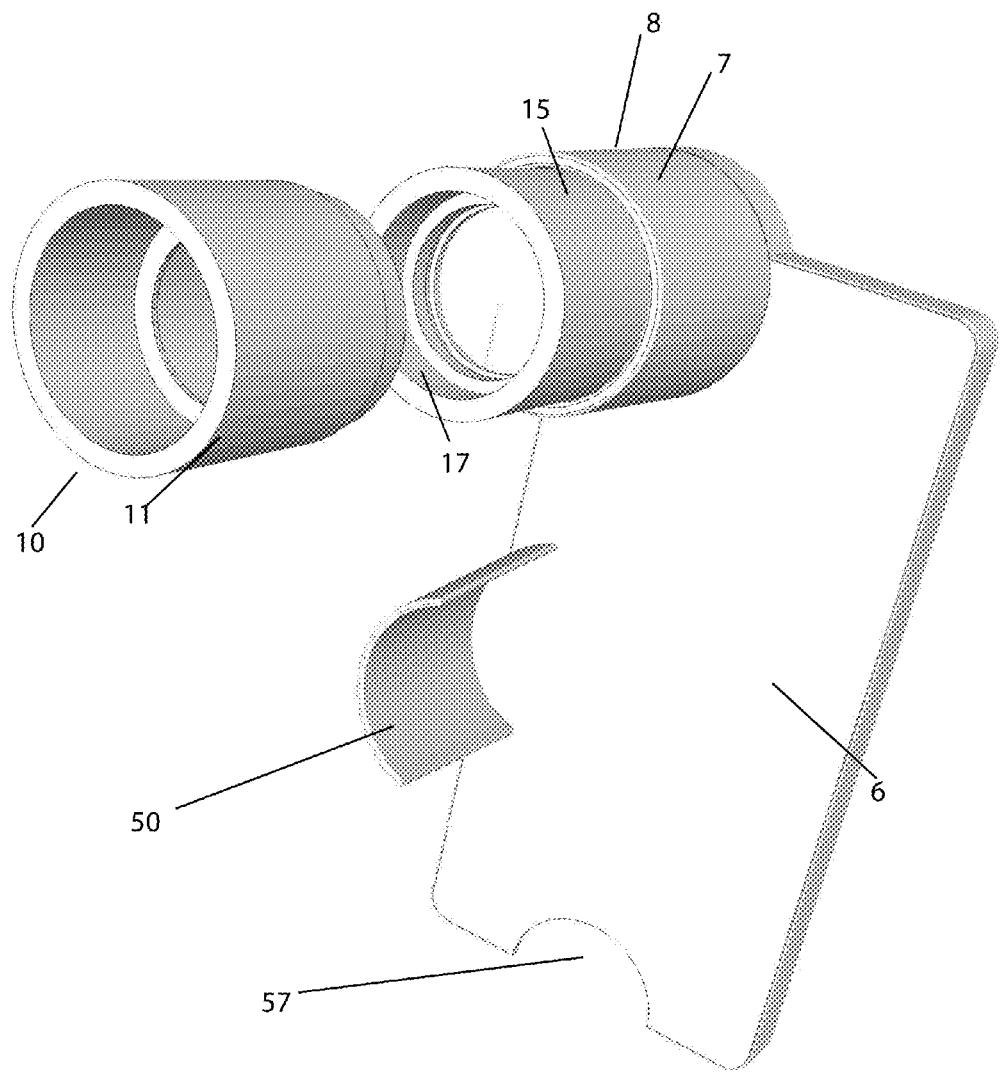
FIG. 20 is a exploded view which shows alternate adapter configured to attach on the lens casing.
Figure 21:
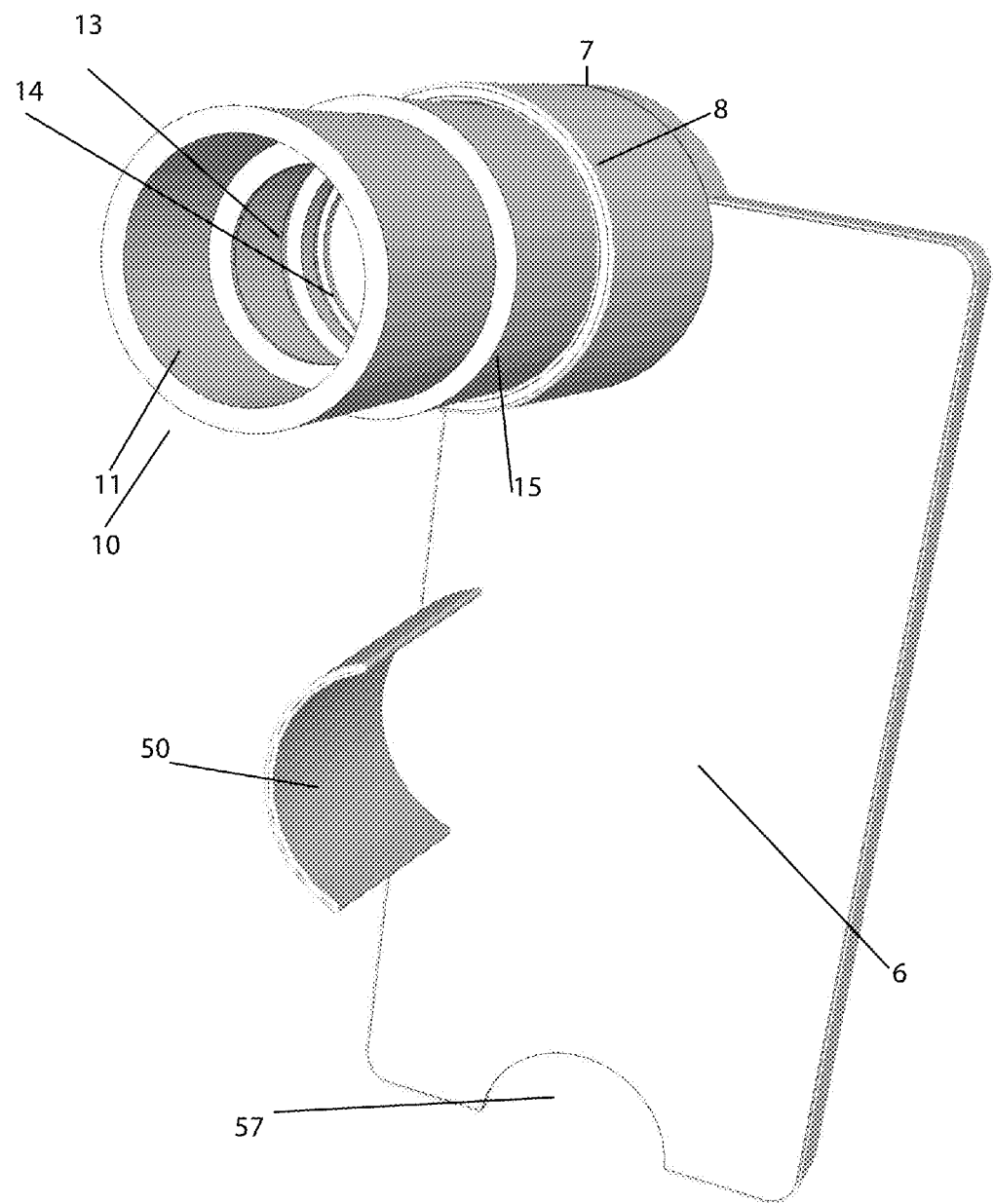
FIG. 21 is a perspective view which shows alternate adapter attached to the lens casing.
Figure 22:
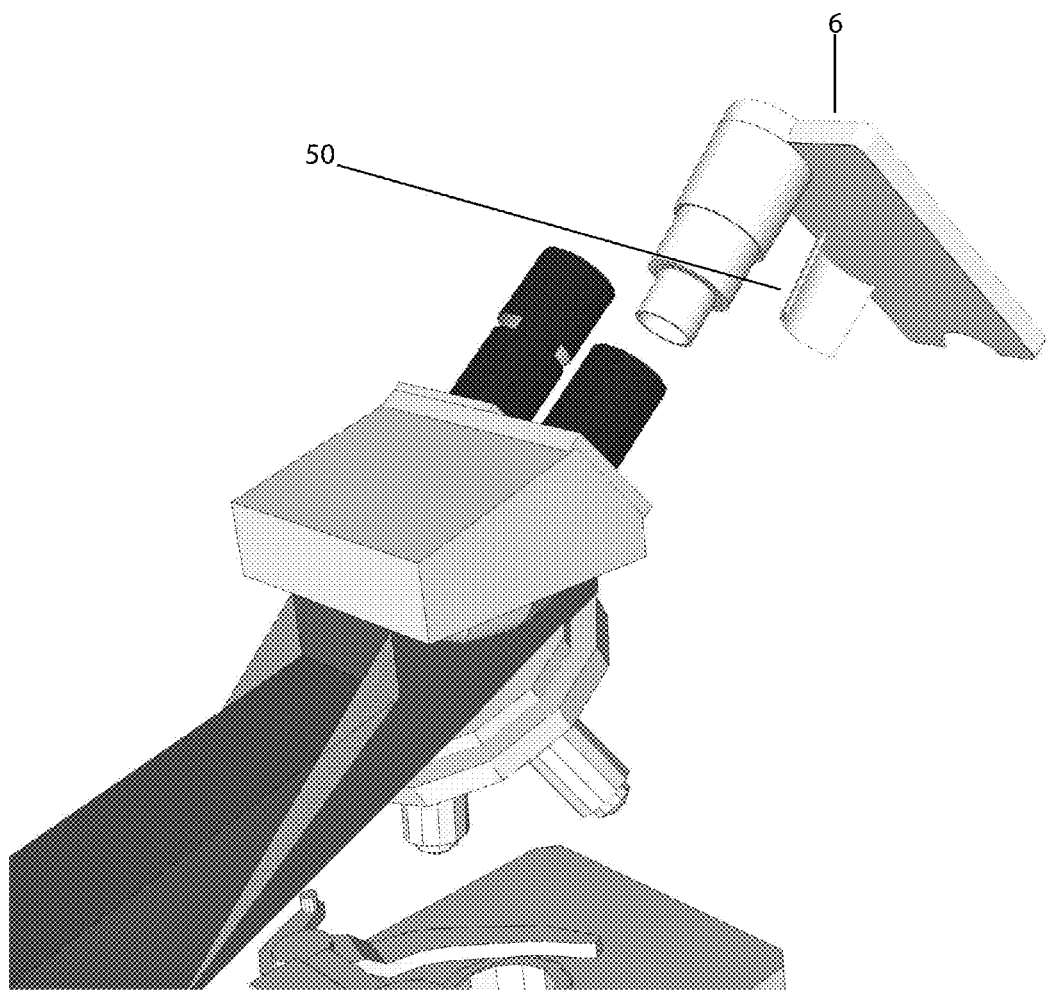
FIG. 22 is a perspective view which shows the case attachment ready to be inserted on a microscope with the eyepiece removed.
Figure 23:
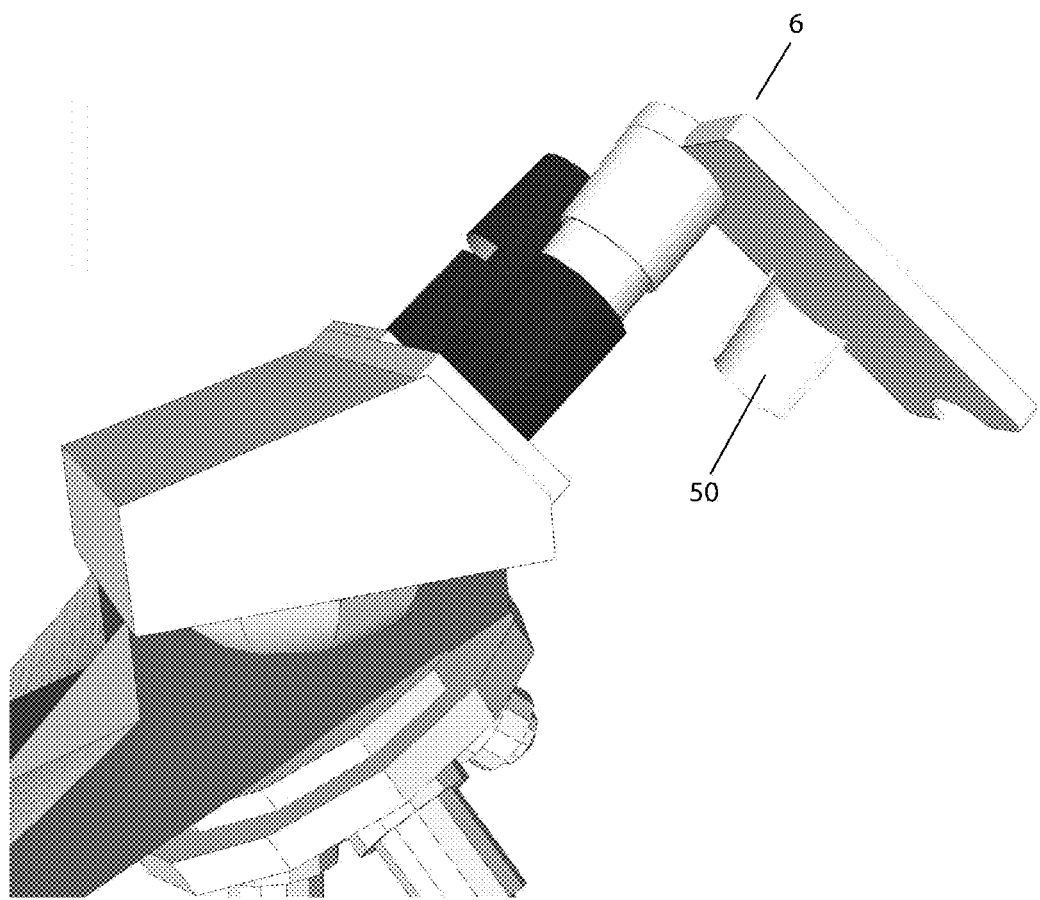
FIG. 23 is a perspective view which shows the case attachment inserted on a microscope with the eyepiece removed.
Figure 24:
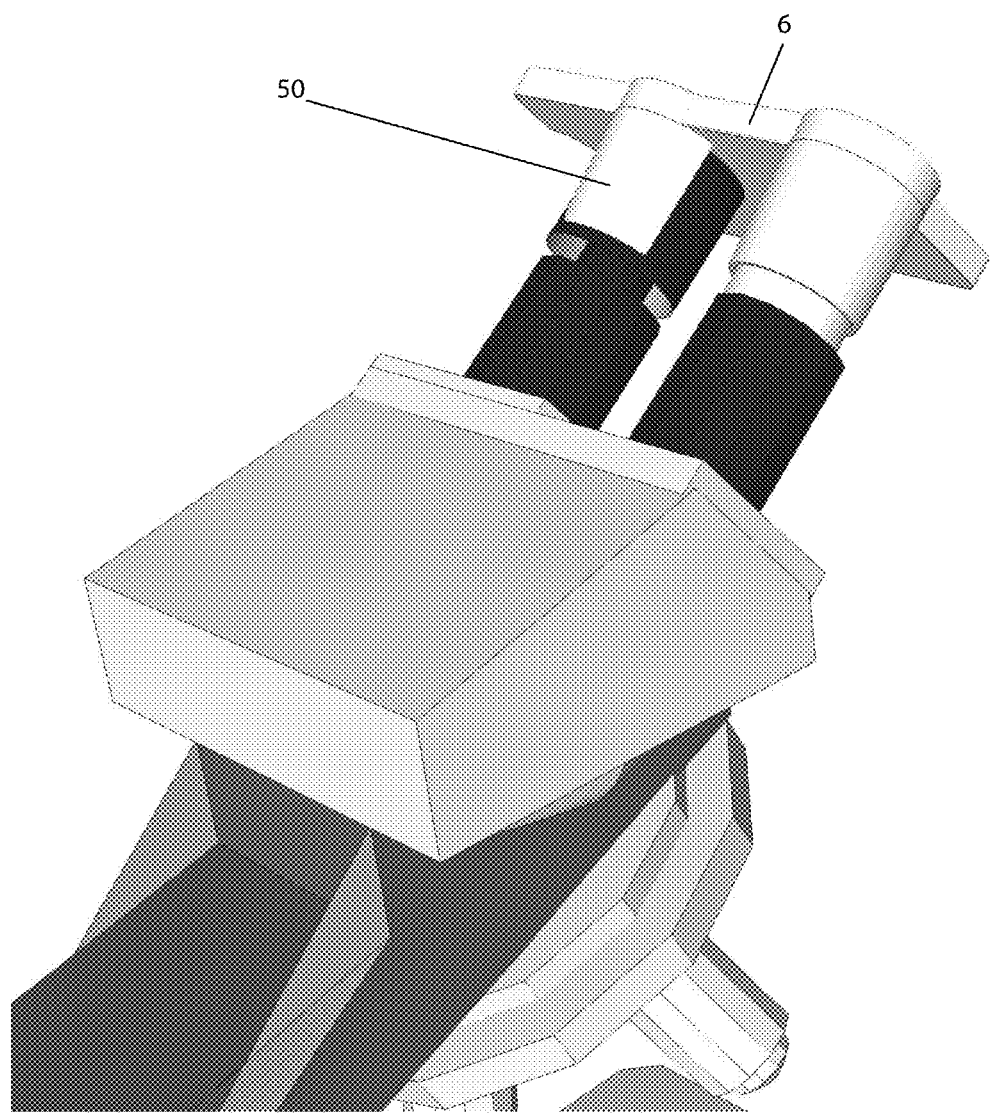
FIG. 24 is a perspective view which shows the case attachment inserted on a microscope with the eyepiece removed and rotated so that the horizontal latch is engaged with the other eyepiece.
Figure 25:
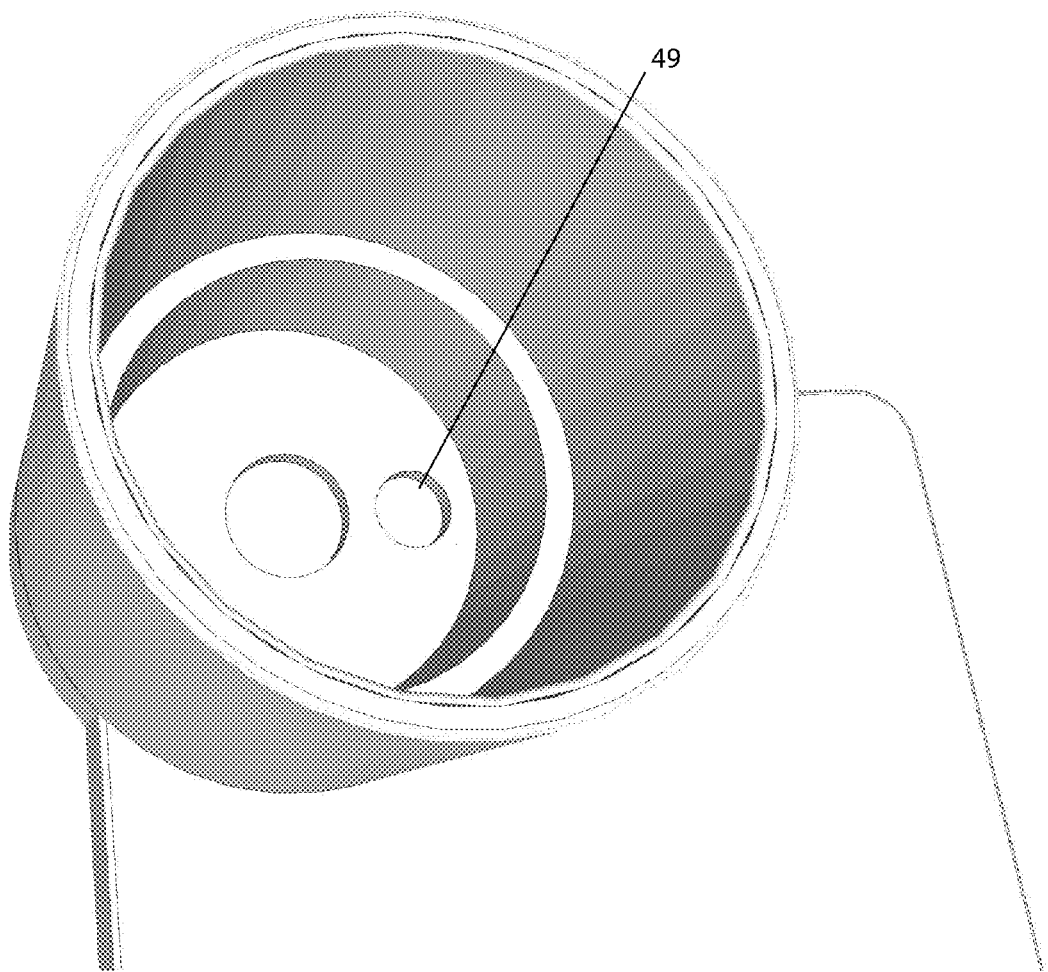
FIG. 25 is a perspective view which shows the lens holder with two apertures matching for the camera and or light on the mobile device.
Figure 26:
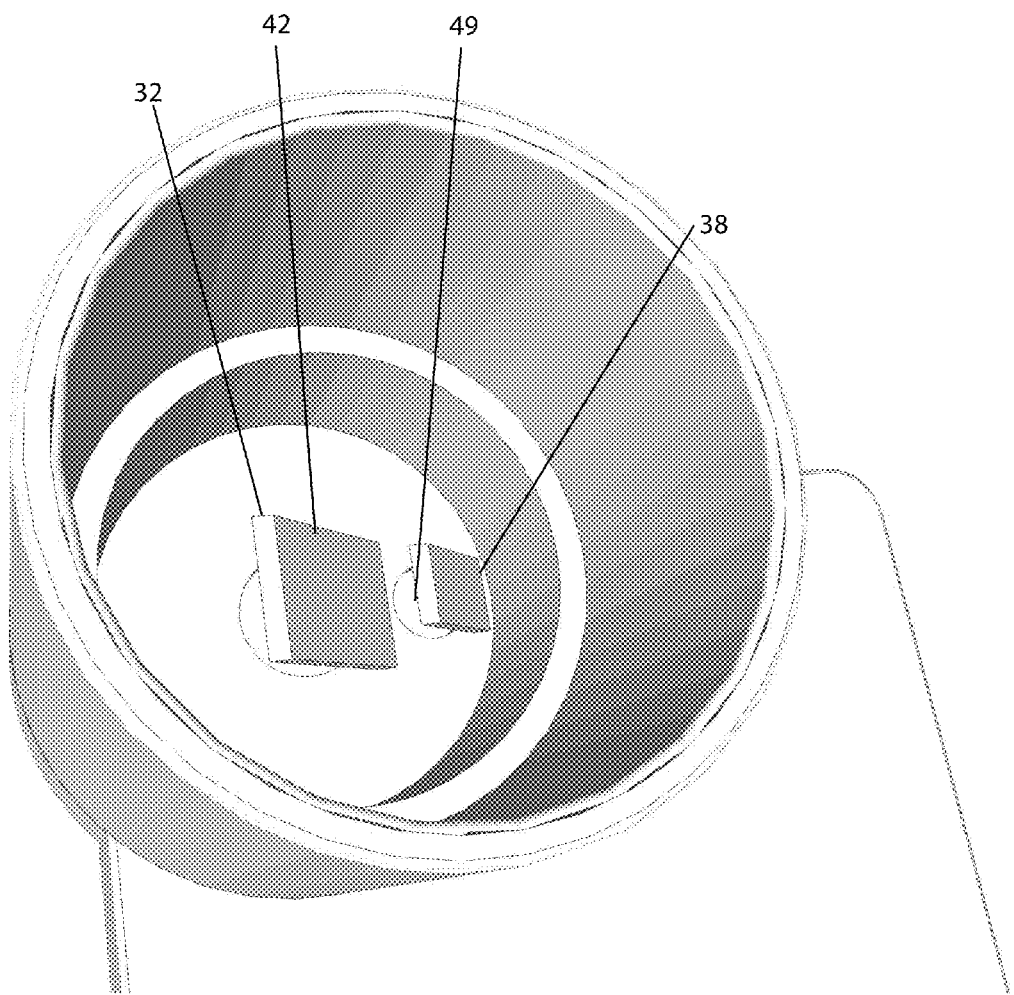
FIG. 26 is a perspective view which shows the lens holder with two apertures matching for the camera and or light on the mobile device and a dichroic mirror covering the camera aperture and a reflective mirror covering the light aperture, when the device is not used in a microscope.
Figure 27:
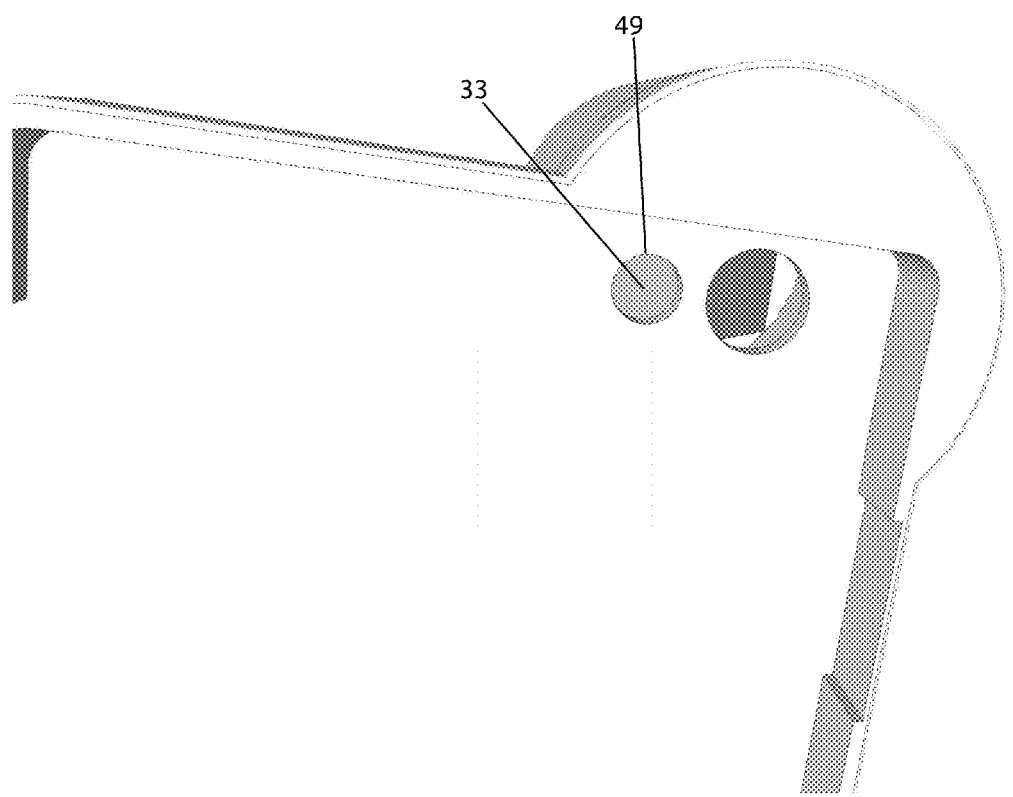
FIG. 27 is a perspective view which shows a light filter covering the light aperture.
Figure 28:
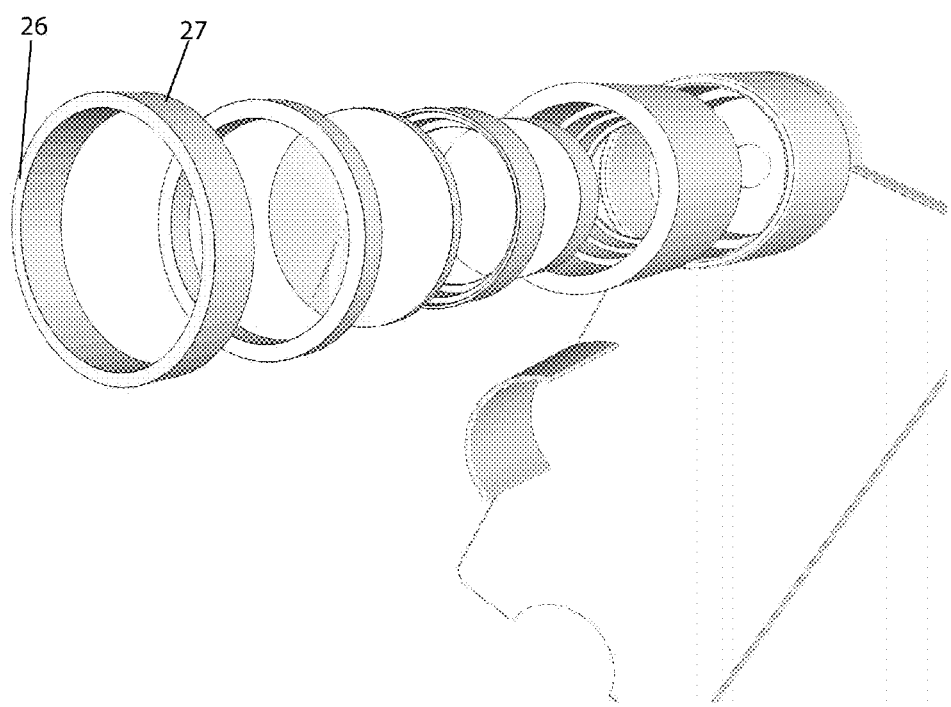
FIG. 28 is a perspective view which shows an led ring that sits as the top component of the lens casing that functions as a light source for object illumination when the device is not used in a microscope.
Figure 29:
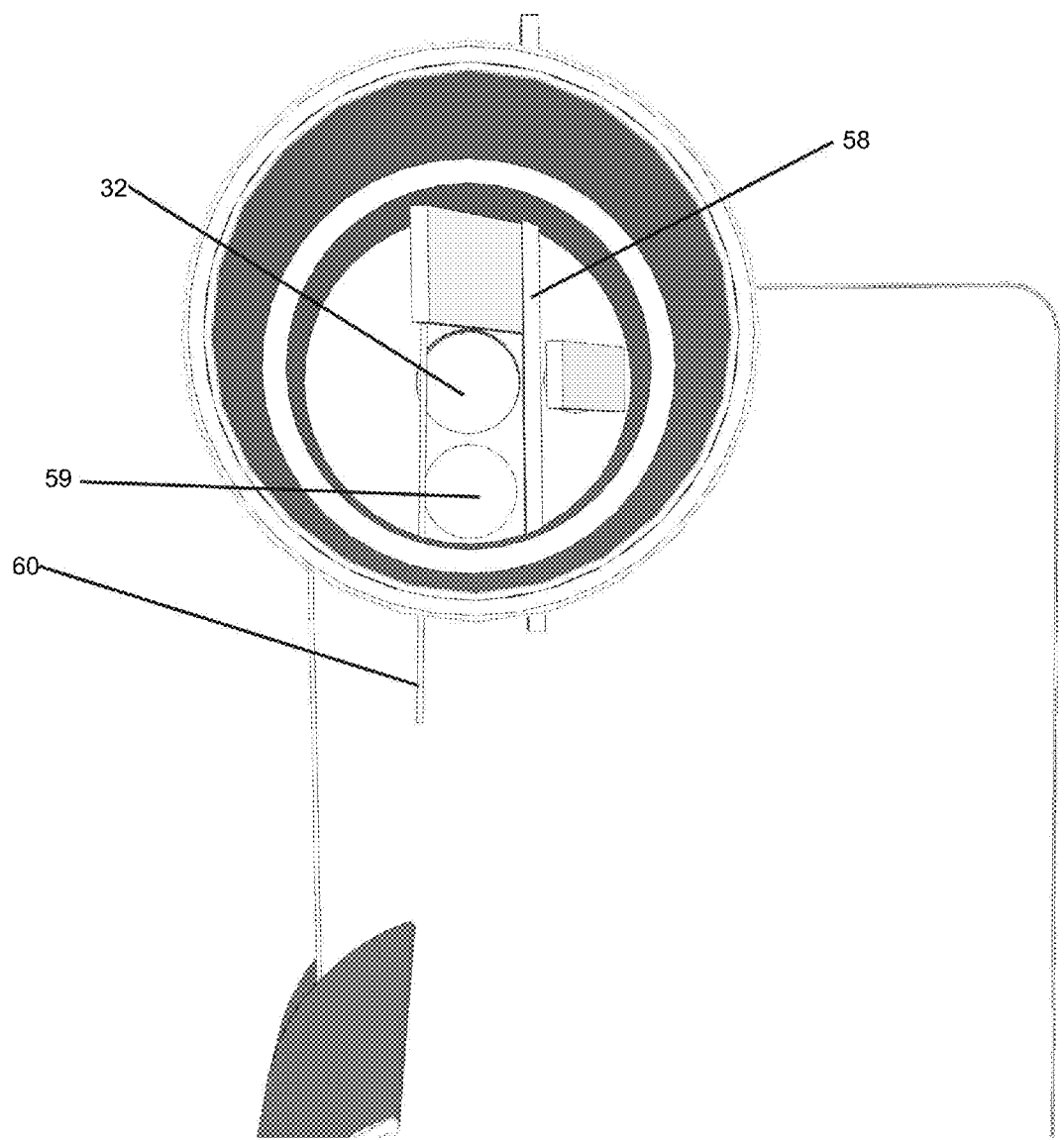
FIG. 29 is a perspective view which shows a filter prepared to slide across the camera aperture.
Figure 30:
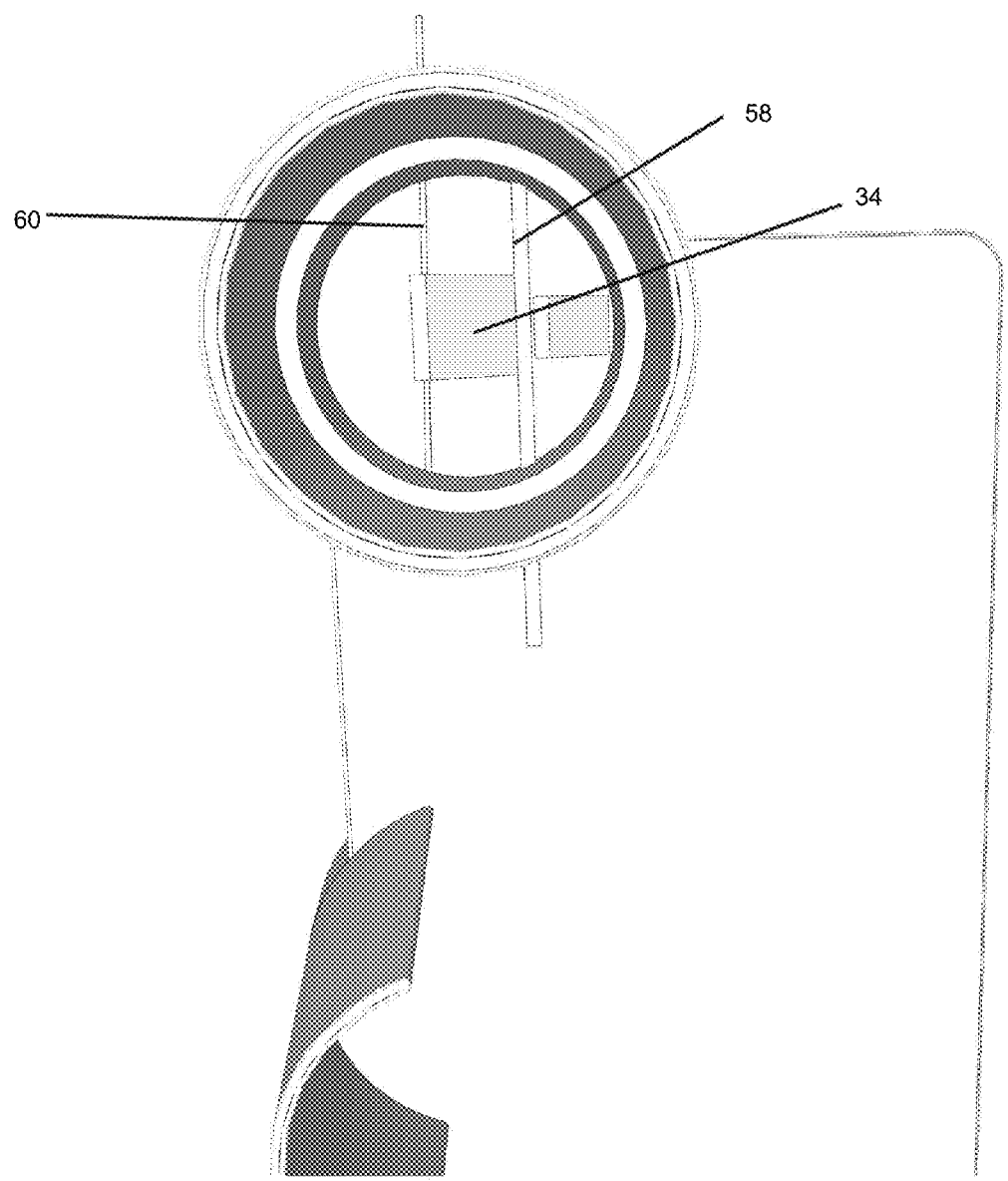
FIG. 30 is a perspective view which shows which shows a filter engaged over the camera aperture by sliding with the bar it attached to. This bar allows sliding of the filter or dichroic mirror from outside.

Further: A sub-method 'configures a lens set' of step 102 FIG. 3 has a multiple sub steps as follows:
1. a person selects an adapter based on the diameter of the eyepiece tube. 301
2. a person prepares the components of the lens casing bottom region 18. 302
3. a person attaches the lens casing attachment region 13 to the adapter attachment region 17. 303

In some embodiments, instead of step 302, the components may already come prepared within the lens casing. The above method is herein identified as method 300, and while these steps are depicted in an order, it is thought that these steps may be performed in one or more alternative orders and still reflect the novelty of the invention.

In more detail, in order to attach and configure a lens set to the lens region of the case attachment, first a person selects an adapter based on the diameter of the eyepiece tube. Spatially, the adapter 10 is preferably positioned behind the microscope and apical to the lens casing. The adapter 10 is attached to the lens casing and the eyepiece tube and is mainly thought to be composed of aluminum however in some embodiments, it is thought that in the adapter 10 may also be composed of other metals, plastic or alternatively composites and/or rubber. The adapter 10 comprises a device that is both inserted on the inside of the microscope and also operably connects to the lens casing 15. One goal of the adapter 10 is to fit in the eyepiece tube of an existing microscope. In turn, The adapter 10 preferably comprises a eyepiece slot region 11, a transition region 12, and finally a lens casing attachment region 13. In some embodiments, instead of selecting an adapter based on the diameter of the eyepiece tube, the person may decide to use the case attachment not with a microscope. In which case no adapter is necessary. In other embodiments, one may use it with a telescope.

The transition region 12 is preferably positioned in between the eyepiece slot region 11 and the lens casing attachment region. The transition region 12 comprises the middle region of the adapter.

Spatially, the eyepiece slot region 11 is preferably positioned within the eyepiece tube and distal to the transition region. The eyepiece slot region 11 comprises the region that inserts into the microscope and functions to fit in the eyepiece tube of an existing microscope. The eyepiece slot region 11 is preferably attached to the eyepiece tube and has a preferred diameter of 23, 28, 30, and 30.5 mm but may range from a minimum of 10 mm to a maximum diameter of 100 mm. Further, the eyepiece slot region 11 has a preferred length of 30 mm but may range from a minimum of 2 mm to a maximum length of 100 mm.

Next a person prepares the components of the lens casing bottom region 18. Spatially, the lens casing bottom region 18 is preferably positioned below the lens casing top region. The lens casing bottom region 18 comprises the bottom region of the lens casing and it preferably contains a securing ring 19, a field lens 20, a lens spacer ring 21, and finally an eye lens 22. In some embodiments, instead of preparing the components of the lens casing bottom region, the components may already come prepared within the lens casing.

The lens casing bottom region has a couple alternative embodiments herein termed the 'LED ring' embodiment, the 'slit light' embodiment, and the 'filter changer' embodiment. The one goal of the 'LED ring' embodiment comprises a ring apical to the securing ring, encircled with one or more light emitting diode (LEDs). These LEDs serve to light up a specimen, (perhaps for examining an eye when used by an ophthalmologist) when the device is not attached to a microscope. The 'LED ring' embodiment preferably comprises an LED ring, LEDs and an attachment lateral surface 27. The LEDs 26 illuminate the subject of the scope and it is thought that the LEDs could be white LEDs, blue LEDs (any functional color) and/or configured to adapt with one or more emission/excitation light filters and the like. The LED ring would removably attach to the lens casing via an external attachment lateral surface 27, which may have threads, magnets, physical connections or other attachment means. It is thought that the light emitting diode (LEDs) could be replaced with any other small light source such as small incandescent light bulb, or laser diode (for specific wavelengths for medical or jewelry examinations).

The 'slit light' embodiment may also comprise a component where in one or more sources of light (such as in the LED ring embodiment) can be varied in intensity, and illumination areas by having a physical structure that can be manipulated to vary the position of the light, or light path, in order to examine different parts of an eye. This may be used by medical professionals for example.

The 'filter changer' embodiment may also comprise one or more filter slider 60 to slide a light filter 59 in front of the camera aperture 32. This embodiment may also have a mirror slider 58 for sliding a mirror in front of the camera aperture 32.

Spatially, the lens casing top region is preferably positioned above the lens casing bottom region. It comprises the top region of the lens casing. The lens casing top region preferably comprises the adapter attachment region 17. The adapter attachment region 17 functions to both 1) handle different eyepieces slot/adapters with one mechanism and to 2) allows you to rapidly switch out adapters for different microscopes, 3) ensure stable fitting for different microscopes without adjustments.

Encompassing the lens casing bottom region and top is the lens casing 15. It is preferably positioned within the lens holder and below the adapter. The lens casing 15 comprises the structure that houses the lenses and interacts with the adapter. It functions to house a removable configurable lens assembly. The lens casing 15 has a preferred inner diameter of 27.6 mm but may range from a minimum of 10 mm to a maximum inner diameter of 100 mm. The lens casing 15 has a preferred outer diameter of 34 mm but may range from a minimum of 15 mm to a maximum outer diameter of 105 mm. The lens casing 15 preferably comprises the lens casing top region and the lens casing bottom region 18, as previously mentioned.

Encompassing the lens casing 15 is the lens set. The lens casing is within the overall the lens set. It is preferably positioned within the lens region of the lens holder and above the spacer region. It comprises the combination of the adapter and the lens casing and functions to safely house the lens set and establish the correct focal distances for capturing images.

Encompassing the lens set is the lens region of the lens holder. Spatially, the lens region 8 is preferably positioned surrounding the lens set and above the spacer region. The lens region 8 is attached to the lens set and comprises the top part of the lens holder 7 that interacts with the lens set. One goal of the lens region 8 is to safely house the lens set and establish the correct focal distances for capturing images.

Encompassing the lens region is the lens holder. Spatially, the lens holder 7 is preferably positioned surrounding the lens set and above the case attachment. The lens holder 7 has a preferred inner diameter of 34 mm and outer diameter of 40 mm but may range from a minimum of 10 mm to a maximum diameter of 100 mm. The lens holder 7 has a preferred height of 35 mm but may range from a minimum of 10 mm to a maximum height of 60 mm. The lens holder 7 preferably comprises a lens region 8, a spacer region 30, and finally a bottom surface 31.

In order to prepare the components of the lens casing bottom region 18 first a person inserts an eye lens 22 into the lens casing 15. The eye lens 22 is preferably positioned within the lens casing, aligned with the camera aperture, and below the lens spacer ring. The eye lens 22 is mainly thought to be composed of glass. The eye lens 22 has a preferred diameter of 26 mm but may range from a minimum of 5 mm to a maximum diameter of 40 mm. The eye lens 22 has a preferred thickness of 5.5 mm but may range from a minimum of 0.5 mm to a maximum thickness of 4 mm. The eye lens is thought to be either double-convex or plano-convex (for chromatic correction). It can be either spherical or aspheric. The eye lens 22 has a preferred diopter of 20 but may range from a minimum of 5 diopter to a maximum of 50 diopter. The eye lens 22 functions to both 1) allow a means to change the field of view and to 2) focus the image on the camera. The eye lens 22 preferably comprises the plano surface 25 preferably positioned facing the camera aperture and the convex surface 23 preferably positioned below the lens spacer ring.

The convex surface 23 is mainly thought to be composed of glass and is preferably aspheric. The camera edge 23 functions to both 1) allow a means to change the field of view and to 2) focus the image on the camera. The convex surface 23 preferably comprises an important focal length. The image distance 24 comprises the distance between the camera edge of the eye lens 22 and camera that matches the specifications of the camera for the image distance required for an image. The image distance 24 has a preferred distance of 14.0 mm but can generally be restricted by (thickness of the lens casing bottom lip+ the height of the holder spacer ring+ the thickness of the case attachment), ranging from 12.5-15.5 mm for forming image on camera with a full field of view.

Opposite the convex surface is the bottom surface of the lens holder which preferably comprises the camera aperture 32. Spatially, the camera aperture 32 is preferably aligned with the lens set and above the camera. The camera aperture 32 comprises the hole in the case attachment that allows light through to the camera. The camera aperture 32 has a preferred diameter of 10 mm but may range from a minimum of 0.8 mm to a maximum diameter of 40 mm.

The bottom surface has a couple alternative embodiments herein termed the 'light mirror' embodiment' embodiment and the 'light only' embodiment. The 'light mirror' embodiment may comprise a light aperture 37 in addition to the camera aperture which allows light from the mobile phone to pass into the lens holder. This would be used to illuminate a subject. The light aperture 37 has an alternative embodiment herein termed the filter changing mechanism. The filter changing mechanism allows to change one or mirror light filters, and ideally would allow switching between different filters, with different emission excitation spectra. In the light mirror embodiment it was thought that mirror below flashlight 38 will be a regular mirror and mirror below camera 42 will be a two-way mirror. Such embodiment allows the merging and separation of illumination and imaging light path.

The 'light mirror' embodiment may additionally comprise a camera dichroic mirror 34 and a light mirror 38. As light comes from the mobile phone, it would bounce from the light mirror to the dichroic mirror and on to the subject. In some embodiments, it is thought that an example of a camera dichroic mirror 34 may include a light filter with altered emission and excitation wavelengths. The camera dichroic mirror 34 preferably comprises the dichroic mirror top surface and the dichroic mirror bottom surface. The filter is thought to be filtering light by its difference of physical properties such as wavelengths, resonance direction (polarized), or angle of entrance/exit. An example of this would be in fluorescein stained eye exam. A blue filter 49 (~480 nm wavelength) may be placed on the camera flashlight aperture, and the blue light coming out of the flashlight may be reflected by the mirror below the flashlight 38. Then the light may be reflected by the dichroic mirror that is sitting below the camera 42 that have a cutoff wavelength of ~500 nm. Then the blue light may be used to excite the fluorescein to emit green light (~520 nm). The green light may then penetrate the dichroic mirror since the wavelength is above the cutoff wavelength and be captured by the camera that have a green filter.

Orthogonal to the bottom surface 31 is, the holder spacer ring. The holder spacer ring 30 has a preferred outer diameter of 34 mm but may range from a minimum of 10 mm to a maximum diameter of 34 mm (equal to inner diameter of lens holder). The holder spacer ring comprises a ledge that serves to space the lens set and eye lens to be the correct distance for imaging from the camera. The holder spacer ring has a preferred height of 11.0 mm but may range from a minimum of 7 mm to a maximum height of 15 mm. In general, the preferred value can be calculated by the (image distance—thickness—bottom lip of the lens casing). The holder spacer ring has a preferred thickness of 1.5 mm but may range from a minimum of 0.5 mm to a maximum thickness of 10 mm. In general, the maximum value is on that is not so big that it obstructs the view, but big enough to hold the lens assembly. The holder spacer ring has a preferred inner diameter of 32 mm but may range from a minimum of 5 mm to a maximum inner diameter of 33.99 mm (smaller than the outer diameter). In general, the maximum value can be calculated by not so big that it obstructs the view. In general, the minimum value can be calculated by big enough to hold the lens assembly. In some alternative embodiments, the ring can also be discontinuous structures such as one or several pillar like structure to set the distance between eye lens and camera.

Encompassing the holder spacer ring 30 is a spacer region 21 preferably positioned above the bottom surface and below the lens set. The spacer region 21 comprises the middle part of the lens holder 7 that establishes the correct image distance (distance between eye lens and camera lens).

Next a person inserts a lens spacer ring 21 into the lens casing 15. The lens spacer ring 21 is preferably positioned within the lens casing, above the eye lens, and below the field lens. The lens spacer ring 21 is mainly thought to be composed of aluminum and functions to provide the correct distance between the eye lens and field lens, however this could be composed of materials such as plastic or other composite materials.

Next a person inserts a field lens 20 into the lens casing 15. The field lens 20 is preferably positioned within the lens casing, above the lens spacer ring, and below the securing ring and is mainly thought to be composed of glass. The field lens 20 has a preferred diopter of 20 but may range from a minimum of 5 diopter to a maximum of 60 diopter. One goal of the field lens 20 is to focus the image from the microscope in concert with the eye lens. The lens is preferred to be double convex lens, but can be other light converging lens such as plano-convex lenses. The lens is preferred to be aspheric for edge correction but can be spherical.

Finally, a person inserts a securing ring 19 into the lens casing 15. Spatially, the securing ring 19 is preferably positioned within the lens casing and above the field lens. The securing ring 19 is mainly thought to be composed of aluminum. The securing ring 19 comprises a structure that securely attaches the field lens within the lens casing.

In summary: sub-method 'prepares the components of the lens casing bottom region' of step 302 has a multiple sub steps as follows:
1. a person inserts an eye lens 22 into the lens casing 15 401
2. a person inserts a lens spacer ring 21 into the lens casing 15. 402
3. a person inserts a field lens 20 into the lens casing 15. 403
4. a person inserts a securing ring 19 into the lens casing 15. 404

The above method is herein identified as method 400, and while these steps are depicted in an order, it is thought that these steps may be performed in one or more alternative orders and still reflect the novelty of the invention.

Next a person would attach the lens casing attachment region 13 of the adapter 10 to the adapter attachment region 17 of the lens casing top region 16. Spatially, the lens casing attachment region 13 is preferably positioned adjacent to the transition region and next to the adapter attachment region. The lens casing attachment region 13 comprises the attachable part of the adapter. One goal of the lens casing attachment region 13 is to have a means for attachment for the lens casing. The lens casing attachment region 13 preferably comprises the attachment means 14. The attachment means 14 comprises the method by which the lens casing attachment region securely attaches to the lens casing top region. One goal of the attachment means 14 is to have a means for attachment for the lens casing. In some embodiments, it is thought that examples of an attachment means 14 may include: tight inserting, a threaded screw, magnets, or structural configurations. In some embodiments, instead of attaching the lens casing attachment region 13 of the adapter 10 to the adapter attachment region 17 of the lens casing top region 16, the person may decide to use the device not for a microscope, In which case no adapter is necessary.

Next a person determines if they want to take images by using a microscope. If they do not want to use a microscope they may use the device to take images of microscopic phenomena by placing the device over the object. If they want to use the microscope the next step would be attaching the adapter to the lens bottom region and then inserting the eyepiece slot region 11 of the adapter 10 into the eyepiece tube of the microscope. Then once inserted a person would rotate the case attachment 6 such that the horizontal latch 50 rests atop the lens piece or eyepiece tube adjacent to inserted tube.

Spatially, the horizontal latch 50 is preferably positioned facing the microscope and on the surface of the case attachment. The horizontal latch 50 is preferably shaped like a crescent. The horizontal latch 50 comprises a surface attached to the case attachment which serves to stabilize the device by interacting with the non used eyepiece tube of the microscope. The horizontal latch 50 has a preferred length of 22 mm but may range from a minimum of 5 mm to a maximum length of 40 mm. The horizontal latch 50 has a preferred height of 35 mm but may range from a minimum of 25 mm to a maximum height of 45 mm. In general, the preferred height value can be calculated by long enough to be supported by the other eyepiece. The horizontal latch 50 functions to both 1) provide a resting spot for the other eyepiece tube in order to stabilize the camera so that it is more usable for a viewer and to 2) have a means to stabilize the camera by rotating it to rest on the other eyepiece tube (not used for imaging).

A summary of the sub-method 'attaches the casing attachment' 500 of Step 104 has a couple additional sub steps as follows:
1. a person inserts the eyepiece slot region 11 of the adapter 10 into the eyepiece tube of the microscope. 501
2. a person rotates the case attachment 6 such that the horizontal latch 50 rests atop the lens piece or eyepiece tube adjacent to inserted tube. 502

In order to attach the phone to the case attachment one would insert the phone in the camera recess of the inside region of the case attachment. Spatially, the camera recess 52 is preferably positioned surrounding the mobile phone and within the inside region. The camera recess 52 comprises the space that holds the mobile phone and functions to both 1) to fit snugly on a phone and to 2) align the camera's center with the camera aperture center. In addition there are four nominal edges that serve to hold in the phone. The inside region contains the camera recess and is preferably positioned surrounding the mobile phone, facing the viewer, and on the surface of the case attachment. The function of the nominal edges are to 1) align the camera's lens center with the camera aperture center. 2) keep phone physically touching the bottom of the recess to secure the phone camera at image distance. 3) keep phone physically touching the bottom of the recess for all areas to keep camera orthogonal to the light path. The inside region is preferably shaped like a rectangle and comprises the underside of the case attachment and its components. The inside region preferably comprises a camera recess 52, a top edge 53, a camera side edge 54, a non-camera side edge 55, and finally a bottom edge 56.

Spatially, the top edge 53 is preferably positioned surrounding the mobile phone and opposite the bottom edge. The top edge 53 is attached to the top of the mobile phone and comprises the top edge of the case attachment. In some embodiments, it is thought that if the top edge 53 is absent then the top edge can have one or more gaps for inputs to the mobile phone.

Spatially, the bottom edge 56 is preferably positioned surrounding the mobile phone and opposite the top edge. The bottom edge 56 is attached to the bottom part of the mobile phone and comprises the bottom edge of the case attachment. In some embodiments, it is thought that if the bottom edge 56 is absent then the bottom edge can have one or more gaps for inputs to the mobile phone. The bottom edge 56 preferably comprises the phone removal gap.

The camera side edge 54 is preferably positioned surrounding the mobile phone, below the camera aperture, and opposite the non-camera side edge. The camera side edge 54 is attached to a side of the mobile phone. The camera side edge 54 comprises the side edge of the case attachment under the camera. In some embodiments, it is thought that if the camera side edge 54 is absent then the camera edge can have one or more gaps for inputs to the mobile phone. Further, in the cases that wherein a camera edge vs non-camera edge cannot be defined, or both edges are equidistant to the camera. The camera side edge and non-camera side may simply refer to opposite long edges of the case attachment.

Spatially, the non-camera side edge 55 is preferably positioned surrounding the mobile phone and opposite the camera aide edge. The non-camera side edge 55 is attached to the one side of the mobile phone and comprises the side edge of the case attachment under the camera. In some embodiments, it is thought that if the non-camera side edge 55 is absent then the non-camera edge can have one or more gaps for inputs to the mobile phone. Further, in the cases that wherein a camera edge vs non-camera edge cannot be defined, or both edges are equidistant to the camera. The camera side edge and non-camera side may simply refer to opposite long edges of the case attachment.

Spatially, the phone removal gap is preferably positioned adjacent to the bottom edge and on the bottom of the case attachment. The phone removal gap is attached to the bottom part of the mobile phone. One goal of the phone removal gap is to allow one to remove the phone. In some embodiments, it is thought that if the phone removal gap is absent then another mechanism may be used to remove the phone easily.

After a person captures video or images on their mobile phone, they can decide whether or not to share the video/images with another for making a real time decision. Non-limiting examples of people who may collaborate in real time examining data include one or more medical professionals, one or more research professionals, one or more jewelers. Alternatively, a person may decide to not share the images in real time and instead use them asynchronously with others or for personal use.

I claim:

1. A method for securing an adapter comprising;
   configuring a mobile phone inside a case attachment;
   attaching said case attachment with a lens casing within a lens holder to an adapter;
   removing a first eyepiece from a first eyepiece tube of a microscope;
   inserting said adapter into a first eyepiece tube of said microscope;
   configuring said case attachment for stability
   where in rotating said configuration comprises the additional steps of;
   rotating the eyepiece tube along a pivot axis until a horizontal latch on said case attachment encounters a second eyepiece;
   stabilizing said horizontal latch on said second eyepiece.

2. The method of claim 1 comprising the additional step of;
   acquiring one or more microscope video or images with said mobile phone.

3. The method of claim 2 comprising the additional step of;
   displaying said video images to one or more persons in real time.

* * * * *